United States Patent
Tokuhiro et al.

(10) Patent No.: US 7,682,676 B2
(45) Date of Patent: Mar. 23, 2010

(54) OPTICAL ELEMENT AND OPTICAL PICKUP DEVICE

(75) Inventors: Setsuo Tokuhiro, Tokorozawa (JP); Tatsuo Ohta, Otsuki (JP)

(73) Assignee: Konica Minolta Opto, Inc., Tokyo (JP)

( * ) Notice: Subject to any disclaimer, the term of this patent is extended or adjusted under 35 U.S.C. 154(b) by 1163 days.

(21) Appl. No.: 11/050,151

(22) Filed: Feb. 4, 2005

(65) Prior Publication Data

US 2005/0248864 A1    Nov. 10, 2005

(30) Foreign Application Priority Data

Feb. 9, 2004  (JP) .............................. 2004-032485

(51) Int. Cl.
 *B32B 3/02* (2006.01)
(52) U.S. Cl. .................. 428/64.1; 359/580; 359/581; 359/355; 359/359; 369/112.01; 369/112.23
(58) Field of Classification Search ............... 428/64.1; 430/270.11; 359/355, 359, 580, 581; 369/112.01, 369/112.23
See application file for complete search history.

(56) References Cited

U.S. PATENT DOCUMENTS

| | | | | |
|---|---|---|---|---|
| 5,026,805 A | * | 6/1991 | Hosoya et al. | 526/309 |
| 5,251,202 A | * | 10/1993 | Kaneko et al. | 369/286 |
| 5,473,594 A | * | 12/1995 | Miyazawa | 369/112.03 |
| 5,481,530 A | * | 1/1996 | Ueda et al. | 369/275.1 |
| 5,512,651 A | * | 4/1996 | Carlson et al. | 528/73 |
| 5,514,504 A | * | 5/1996 | Iijima et al. | 430/20 |
| 6,066,401 A | * | 5/2000 | Stilburn | 428/432 |
| 6,278,683 B1 | * | 8/2001 | Hayashi | 369/275.5 |
| 6,939,613 B2 | * | 9/2005 | Takahashi et al. | 428/447 |
| 7,286,464 B2 | * | 10/2007 | Hirayama | 369/112.23 |
| 2003/0149190 A1 | * | 8/2003 | Duan et al. | 525/439 |
| 2004/0042084 A1 | * | 3/2004 | Ikenaka et al. | 359/583 |
| 2004/0047040 A1 | * | 3/2004 | Ota et al. | 359/566 |

FOREIGN PATENT DOCUMENTS

| | | | |
|---|---|---|---|
| JP | 08-101301 | | 4/1996 |
| JP | 2001-215304 | * | 8/2001 |

* cited by examiner

*Primary Examiner*—Elizabeth Mulvaney
(74) *Attorney, Agent, or Firm*—Finnegan, Henderson, Farabow, Garrett & Dunner, L.L.P.

(57) ABSTRACT

An optical element irradiated with a light flux having a wavelength of 350 nm to 450 nm, is provided with a synthetic resin base material; and an antireflection film provided on the synthetic resin base material and including a contact layer being in contact with the synthetic resin base material, wherein the contact layer is a film made of a material containing no oxygen atom or a film made of a mixed material or a material containing no oxygen atom and a material containing an oxygen atom in which the mixed material contains the material containing an oxygen atom less than 10%.

7 Claims, 4 Drawing Sheets

OPTICAL ELEMENT AND OPTICAL PICKUP DEVICE

BACKGROUND OF THE INVENTION

The present invention relates to an optical element and an optical pickup device, and in particular, to an optical element that transmits a light flux coming from a light source with a short wavelength and to an optical pickup device employing the optical element.

In recent years, there have been advanced rapidly the research and development for the high density optical disc system that can conduct recording and reproducing of information by the use of a violet semiconductor laser with a wavelength of about 400 nm. As an example thereof, in the case of the optical disc conducting recording and reproducing of information under the specifications of NA 0.65 and light source wavelength 407 nm, information of 20-30 GB per one side can be recorded for the optical disc with a diameter of 12 cm that is the same as that of DVD (NA: 0.6, wavelength of light source: 650 nm and storage capacity: 4.7 GB).

(Patent Document 1) TOKKAI No. 2003-303436
(Patent Document 2) TOKKAIHEI No. 8-179103

Incidentally, in the optical pickup device, there is used an optical element made of plastic and is relatively inexpensive and can be manufactured easily on a mass production basis, and on the optical surface of the optical element, there is formed an antireflection film. However, according to the tests made by the inventors of the present invention, it was found that, when a laser beam with a short wavelength emitted from the violet semiconductor laser was applied to the optical lens made of plastic for a certain period of time, optical characteristics of the irradiated optical element were deteriorated considerably. Incidentally, in the Patent Document 2, there is disclosed a technology for forming a film of a material MgFx (x=2-2.1) on a base board. In this case, however, optical characteristics are not deteriorated even if the laser beam with a short wavelength is applied, because the base board is made of glass.

SUMMARY OF THE INVENTION

The invention has been achieved in view of the problems stated above, and its object is to provide an optical element wherein an antireflection film is formed on synthetic resin and deteriorations of optical characteristics can be controlled even if the laser beam with a short wavelength is applied, and to provide an optical pickup device employing the optical element.

An optical element described in Item 1 is an optical element that is composed of a synthetic resin base material and an antireflection film provided on the synthetic resin base material, and is irradiated by a light flux with wavelength 350-450 nm wherein the antireflection film is composed of a single layer or plural layers, and at least a layer that is in contact with the synthetic resin base material is a film made of a material containing no oxygen atom, or a film made of a material representing a mixture of a material containing no oxygen atom and a material containing oxygen atoms wherein a rate of the material containing oxygen atoms is 10% or less.

When forming an antireflection film on an optical element made of synthetic resin, it is a general tendency to use an oxide dielectric material. An oxide has a merit that a hard film can be obtained generally without raising a temperature in the course of forming a film.

However, when the inventors of the invention investigated the optical element having deteriorated optical characteristics, they found out that the optical characteristics were deteriorated by microscopic cavities and creases generated on the surface of the optical element where the antireflection film was formed. After further convergent studies of the inventors, they drew deduction from their studies that an oxygen atom in the oxide dielectric material used for the antireflection film and a radical in synthetic resin (a radical having broken covalent bond and high reactivity) cause a chain reaction when they are irradiated by a laser beam with wavelength of about 400 nm, and thereby, the synthetic resin is oxidized and deteriorated to cause formal changes.

Based on such deduction, forming all layers constituting the antireflection film by the use of materials which hardly contain oxygen is effective for preventing deterioration by oxidation of synthetic resin base materials. Namely, in the optical element mentioned above, if the layer that is in contact with the synthetic resin base material is made to be a film that is formed with a material containing no oxygen atom (or a film formed with a material representing a mixture of a material containing no oxygen atom and a material containing oxygen atoms wherein the rate of the material containing the oxygen atoms is less than 10% is also effective), it is possible to provide an optical element in which oxidation-caused deterioration of the synthetic resin base material is controlled even when the synthetic resin base material is irradiated by the light flux with wavelength 350-450 nm, and thereby the deterioration of optical characteristics is controlled.

DETAILED DESCRIPTION OF THE PREFERRED EMBODIMENT

Figure 1:
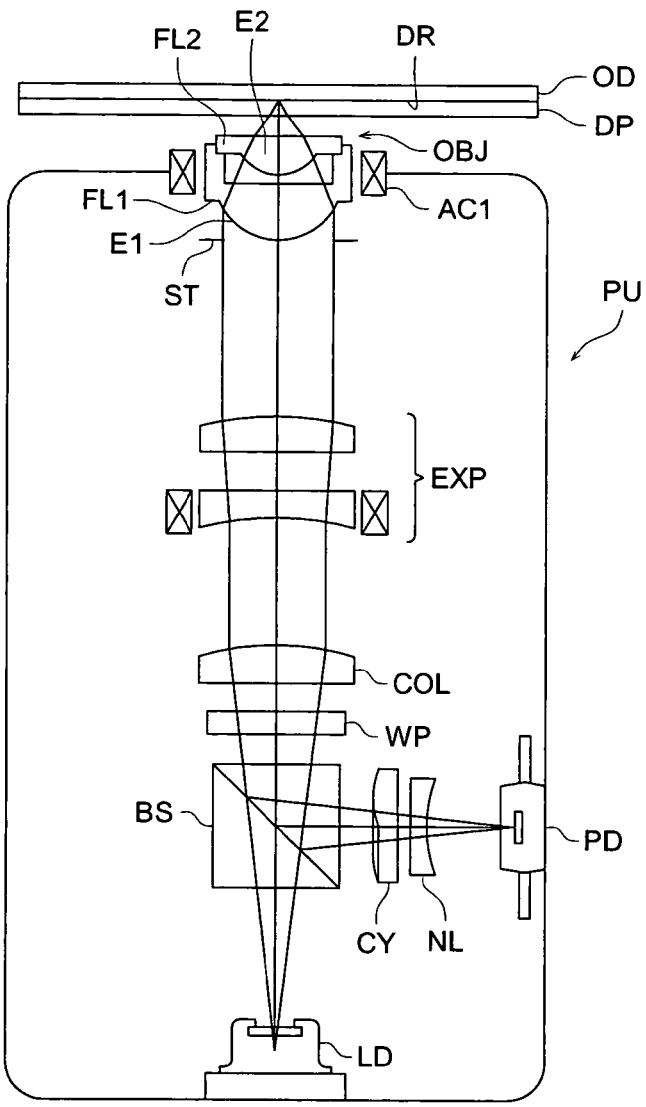
FIG. 1 is a schematic sectional view of an optical pickup device capable of conducting recording and reproducing of information for an optical disc.

Firstly, a preferable structure to attain the above object will be described.

An optical element described in Item 2 is the optical element described in Item 1, wherein the material containing no oxygen atom is selected from the group including magnesium fluoride, lanthanum fluoride, neodymium fluoride, cerium fluoride, calcium fluoride, cryolite ($Na_3AlF_6$), lead fluoride, lithium fluoride, thorium fluoride, silicon nitrate, and zinc sulfide.

An optical element described in Item 3 is the optical element described in Item 1, wherein the antireflection film is composed of a plurality of layers, and all layers represent a film formed with a material containing no oxygen atom, or a film formed with a material representing a mixture of a material containing no oxygen atom and a material containing oxygen atoms wherein the rate of the material containing the oxygen atoms is not more than 10%.

An optical element described in Item 4 is the optical element described in Item 1, wherein the antireflection film is composed of a plurality of layers, and at lease one layer among layers other than the layer that is in contact with a synthetic resin base material is a film that is formed with a material containing oxygen atoms. If all layers constituting an antireflection layer are formed with materials containing no oxygen, it is not possible to heat in the course of forming a film on the synthetic resin base material, and therefore, there is a fear that the film may turn out to be one which has a low mechanical strength such as hardness, and easily causes appearance deterioration such as cracks or feathering. Accordingly, the outermost layer of the antireflection film is formed by using a material containing oxygen atoms, to enhance the mechanical strength and to control the appearance deterioration. As a material containing oxygen atoms, in this case, $SiO_2$, for example, can be used.

An optical element described in Item 5 is the optical element described in Item 1, wherein the antireflection film is composed of a plurality of layers, and the outermost layer (a layer farthest from the synthetic resin base material) is a film formed with a material containing oxygen atoms, thereby, the mechanical strength may further be enhanced, and appearance deterioration can be controlled.

An optical element described in Item 6 is the optical element described in anyone of Items 1 to 5, wherein the synthetic resin base material is a base material made of a resin containing a polymer including an alicyclic type structure.

An optical element described in Item 7 is the optical element described in Item 6, wherein the resin containing polymers having an alicyclic structure contains repeating unit (a) having an alicyclic structure represented by following general formula (1) and repeating unit (b) comprising a chain structure represented by following general formula (2) and/or (3) so as to make the sum content of not less than 90 weight %, and, further, make the content of repeating unit (b) not less than 1 weight % and less than 10 weight % among whole repeating units of a polymer having a weight average molecular weight (Mw) of 1,000 to 1,000,000, and the chain of the repeating unit (a) satisfies the following formula: (That is, $A \leq 0.3 \times B$, where A=(a weight average molecular weight of a repeating unit chain having an alicyclic type structure), and B=(a weight average molecular weight of a polymer having an alicyclic type structure (Mw)×(the number of repeating units having an alicyclic type structure/the number of whole repeating units constructing the alicyclic type structure).

General formula (1)

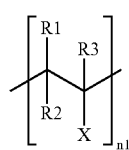

General formula (2)

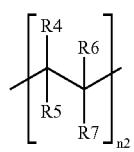

General formula (3)

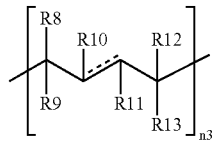

In formula (1), X represents an alicyclic hydrocarbon group, R1-R13 in formula (1), (2) and (3) each independently represent a hydrogen atom, a chain hydrocarbon group, a halogen atom, an alkoxy group, a hydroxyl group, an ether group, an ester group, a cyano group, an amido group, an imido group, a silyl group and a chain hydrocarbon group substituted by a polar group (a halogen atom, an alkoxy group, a hydroxyl group, an ether group, an ester group, a cyano group, an amido group, an imino group or a silyl group). Among them, a hydrogen atom or a chain hydrocarbon group having a carbon number of 1-6 is preferred because of excellent heat resistance and a low water absorbing property. Halogen atoms include a fluorine atom, a chlorine atom, a bromine atom and an iodine atom. Chain hydrocarbon groups substituted by a polar group include, for example, a halogenated alkyl group having a carbon number of 1-20, preferably of 1-10 and more preferably of 1-6. Chain hydrocarbon groups include, for example, an alkyl group having a carbon number of 1-20, preferably of 1-10 and more preferably of 1-6; and alkenyl group having a carbon number of 2-20, preferably of 2-10 and more preferably of 2-6.

X in general formula (1) represents an alicyclic hydrocarbon group, and the carbon number constituting which is generally 4-20, preferably 4-10 and more preferably 5-7. By setting the carbon number constituting an alicyclic structure into this range, double refraction can be reduced. Further, an alicyclic structure may include not only a monocyclic structure but also polycyclic structures such as a norbornane ring and a dicyclohexane ring.

The alicyclic hydrocarbon group may be provided with a carbon-carbon unsaturated bond, however, the content is not more than 10%, preferably not more than 5% and more preferably not more than 3%, based on the total carbon-carbon bonds. By setting the content of carbon-carbon unsaturated bonds of an alicyclic hydrocarbon group into this range, transparency and heat resistance are improved. Further, to carbon atoms constituting an alicyclic hydrocarbon group, bonded may be such as a hydrogen atom, a hydrocarbon group, a halogen atom, an alkoxy group, a hydroxyl group, an ether group, an ester group, a cyano group, an amido group, an imido group, a silyl group and a chain hydrocarbon group substituted by a polar group (a halogen atom, an alkoxy group, a hydroxyl group, an ether group, an ester group, a cyano group, an amido group, an imino group or a silyl group). Among them, a hydrogen atom or a chain hydrocarbon group having a carbon number of 1-6 is preferred because of excellent heat resistance and a low water absorbing property.

Further, ". . . " in general formula (3) represents a carbon-carbon saturated bond or a carbon-carbon unsaturated bond, and the content of an unsaturated bond is generally not more than 10%, preferably not more than 5% and more preferably not more than 3%, based on the total carbon-carbon bonds constituting the main chain, when transparency and heat resistance are strongly required.

Among repeating units represented by general formula (1), the repeating units represented by general formula (4) is excellent with respect to heat resistance and a low water absorbing property.

General formula (4)

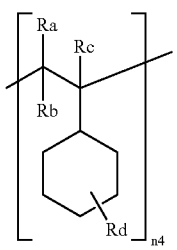

Among repeating units represented by general formula (2), the repeating units represented by general formula (5) is excellent with respect to heat resistance and a low water absorbing property.

General formula (5)

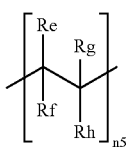

Among repeating units represented by general formula (3), the repeating units represented by general formula (6) is excellent with respect to heat resistance and a low water absorbing property.

General formula (6)

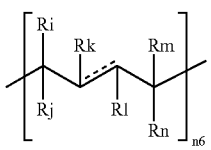

Ra, Rb, Rc, Rd, Re, Rf, Rg, Rh, Ri, Rj, Rk, Rl, Rm and Rn in general formula (4), (5) and (6) each independently represent a hydrogen atom or a lower chain hydrocarbon group, and hydrogen atom or a lower alkyl group having a carbon number of 1-6 is preferred due to excellent with respect to heat resistance and low water absorbability.

Among repeating units of a chain structure represented by general formula (2) and (3), the repeating units of a chain structure represented by general formula (3) exhibits a more excellent strength property of obtained hydrocarbon type polymer.

In this invention, the sum content of repeating unit (a) provided with an alicyclic structure represented by general formula (1) and repeating unit (b) provided with a chain structure represented by general formula (2) and/or general formula (3), in hydrocarbon copolymer, is generally not less than 90%, preferably not less than 95% and more preferably not less than 97%, based on weight. By setting the sum content into the aforesaid range, low double refraction, heat resistance, low water absorbability and mechanical strength are highly suitably balanced.

The content of repeating unit (b) provided with a chain structure in an alicyclic hydrocarbon type copolymer is appropriately selected depending on the objective of application, however, is generally in a range of 1-10%, preferably of 1-8% and more preferably of 2-6%, based on weight. When the content of repeating unit (b) is in the aforesaid range, low double refraction, heat resistance and low water absorbability are highly suitably balanced.

Further, a chain length of repeating unit (a) is sufficiently short compared to a molecular chain length of an alicyclic hydrocarbon type copolymer, and specifically A is in a range of not more than 30% of B, preferably not more than 20%, more preferably not more than 15% and most preferably not more than 10%, when A=(a weight average molecular weight of a repeating unit chain provided with an alicyclic structure) and B=(a weight average molecular weight of an alicyclic hydrocarbon type copolymer (Mw)×(a number of repeating units provided with an alicyclic structure/a number of the whole repeating unit constituting an alicyclic hydrocarbon type copolymer)). Low double refraction is inferior when A is out of this range.

Further, a chain length of repeating unit (a) preferably has a specific distribution. Specifically, A/C is preferably in a range of not less than 1.3, more preferably 1.3-8 and most preferably 1.7-6, when A=(a weight average molecular weight of a repeating unit chain provided with an alicyclic structure) and C=(a number average molecular weight of a repeating unit chain provided with an alicyclic structure). A blocking degree increases when A/C is excessively small while a random degree increases when A/C is excessively large and low double refraction is inferior in the both cases.

The molecular weight of an alicyclic hydrocarbon type copolymer is in a range of 1,000-1,000,000, preferably 5,000-500,000, more preferably 10,000-300,000 and most preferably 50,000-250,000 as a polystyrene (or polyisoprene) equivalent weight average molecular weight which is measured by means of gel permeation chromatography (hereinafter, referred to as GPC). A strength property of the molded material is inferior when the weight average molecular weight of an alicyclic hydrocarbon type copolymer is excessively small, while the double refraction of the molded material become large when it is excessively too large.

The molecular weight distribution of such copolymers can be appropriately selected depending on the objective of the application, however, it is generally in a range of not more than 2.5, preferably not more than 2.3 and more preferably not more than 2, as a ratio (Mw/Mn) of a polystyrene (or polyisoprene) equivalent weight average molecular weight which is measured by means of GPC (Mw) to a number average molecular weight (Mn). Mechanical strength and heat resistance can be highly suitably balanced when Mw/Mn is in this range.

The glass transition temperature (Tg) of the copolymer may be suitably selected depending on the objective of the application, however, is generally 50-250° C., preferably 70-200° C. and more preferably 90-180° C.

Manufacturing Method of Alicyclic Hydrocarbon Type Copolymer

Manufacturing method of alicyclic hydrocarbon type copolymer of this invention includes (1) a method in which aromatic vinyl type compound and another copolymerizable monomer are copolymerized and carbon-carbon unsaturated bonds of the main chain and of aromatic ring are hydrogenated; and (2) a method in which alicyclic vinyl type compound and another copolymerizable monomer are copolymerized and the resulting product is appropriately hydrogenated.

In the case of manufacturing an alicyclic hydrocarbon type copolymer of this invention according to the aforesaid method, it can be efficiently prepared by hydrogenating carbon-carbon unsaturated bonds in the main chain and unsaturated rings such as an aromatic or a cycloalkene ring of a copolymer, which is a copolymer of an aromatic vinyl type compound and/or an alicyclic vinyl type compound (a') and copolymerizable another monomer (b') and a repeating unit arising from compound (a') in the copolymer is provided with a chain structure in which D is not more than 30% of E, preferably not more than 20%, more preferably not more than 15% and most preferably not more than 10%, when D=(the weight average molecular weight of a repeating unit chain arising from an aromatic vinyl type compound and/or an alicyclic vinyl type compound) and E=(the weight average molecular weight of hydrocarbon type copolymer (Mw)×(the number of a repeating unit chain arising from an aromatic vinyl type compound and/or an alicyclic vinyl type compound/the total number of repeating unit constituting a hydrocarbon type copolymer)). The low double refraction property of the obtained alicyclic hydrocarbon type copolymer is inferior when D is out of the aforesaid range.

In this invention, method (1) is preferred to prepare an alicyclic hydrocarbon type copolymer more efficiently.

Copolymers before the above-described hydrogenation is further preferably have D/F in a definite range when F=(a number average molecular weight of a repeating unit chain arising from an aromatic vinyl type compound and/or an alicyclic vinyl type compound). Specifically, D/F is preferably in a range of not less than 1.3, more preferably 1.3-8 and most preferably 1.76. The low double refraction property of the obtained alicyclic hydrocarbon type copolymer is inferior when D/F is out of this range.

The weight average molecular weight and number average molecular weight of a repeating unit arising from the aforesaid compound (a') can be determined, for example, by a method, described in Macromolecules, vol. 16, pp. 1925-1928 (1983), in which unsaturated double bonds in an aromatic vinyl type copolymer are reductive cleaved after having been subjected to ozone addition and the molecular weight of obtained aromatic vinyl chain is measured.

The molecular weight of a copolymer before hydrogenation is in a range of 1,000-1,000,000, preferably 5,000-500,000 and more preferably 10,000-300,000, as a polystyrene (or polyisoprene) equivalent weight average molecular weight which is measured by means of GCP. A strength property of the obtained alicyclic hydrocarbon type copolymer is inferior when the weight average molecular weight (Mw) of the copolymer is excessively small, while the hydrogenation reactivity is inferior when it is excessively large.

Specific examples of aromatic vinyl type compounds utilized in above-described method (1) include, for example, styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 2,4-dimethylstyrene, 4-t-butylstyrene, 5-t-butyl-2-methylstyrene, monochlorostyrene, dichlorostyrene, monofluorostyrene and 4-phenylstyrene, and such as styrene, 2-methylstyrene, 3-methylstyrene and 4-methylstyrene are preferable.

Specific examples of alicyclic vinyl type compounds utilized in above-described method (2) include, for example, cyclobutylethylene, cyclopentylethylene, cyclohexylethylene, dicycloheptylethylene, cyclooctylethylene, nolbonyl-ethylene, dicyclohexylethylene, α-methylcyclohexylethylene, α-t-butylcyclohexylethylene, cyclopentenylethylene, cyclohexenylethylene, cyclobutenylethylene, cyclooctenylethylene, cyclodecenylethylene, nolbonenylethylene, α-methylcyclohexenylethylene and α-t-butylcyclohexenylethylene, and cyclohexylethylene and α-methylcyclohexylethylene are preferable among them.

These aromatic vinyl type compounds and alicyclic vinyl type compounds can be utilized alone or in combination of two or more types.

Copolymerizable another monomers are not specifically limited, and utilized are such as chain vinyl compounds and chain conjugated diene compounds. In the case of utilizing chain conjugated diene compounds, the operating properties in the manufacturing process is superior, as well as the strength property of obtained alicyclic hydrocarbon type copolymer is excellent.

Specific examples of chain vinyl compounds include, for example, chain olefin monomers such as ethylene, propylene, 1-butene, 1-pentene and 4-methyl-1-pentene; nitrile type monomers such as 1-cyanoethylene (acrylonitrile), 1-cyano-1-methylethylene (methacrylonitrile) and 1-cyano-1-chloroethylene (α-chloroacrylonitrile), (meth)acrylic acid ester type monomers such as 1-(methoxycarbonyl)-1-methylethylene (methacrylic acid methyl ester), 1-(ethoxycarbonyl)-1-methylethylene (methacrylic acid ethyl ester), 1-(propoxycarbonyl)-1-methylethylene (methacrylic acid propyl ester), 1-(butoxycarbonyl)-1-methylethylene (methacrylic acid butyl ester), 1-methoxycarbonylethylene (acrylic acid methyl ester), 1-ethoxycarbonylethylene (acrylic acid ethyl ester), 1-propoxycarbonylethylene (acrylic acid propyl ester) and 1-butoxycarbonylethylene (acrylic acid butyl ester); unsaturated fatty acid type monomers such as 1-carboxyethylene (acrylic acid), 1-carboxy-1-methylethylene (methacrylic acid) and maleic anhydride, preferable are chain olefin monomers and most preferable are ethylene, propylene and 1-butene.

Conjugated dienes include, for example, 1,3-butadiene, isoprene, 2,3-dimethyl-1,3-butadiene, 1,3-pentadiene and 1,3-hexadiene. Among these chain vinyl compounds and chain conjugated dienes, preferable are chain conjugated dienes and specifically preferable are butadiene and isoprene.

These chain vinyl compounds and chain conjugated dienes each can be utilized alone or in combination of two or more types.

A method to polymerize compounds (a') is not specifically limited and includes such as a one-step polymerization method (a batch method) and a monomer successive addition method (a method in which, after starting polymerization by using a part of the whole using amount of the monomer, polymerization is proceeded by successively adding the residual monomer). In particular, a hydrocarbon type copolymer provided with a preferable chain structure can be prepared by employing a monomer successive addition method. A copolymer before hydrogenation has the more random structure, the smaller is the aforesaid D, and/or the larger is the D/F. How much degree of random structure a copolymer has, is determined by a rate ratio of a polymerization rate of aromatic vinyl compound to that of copolymerizable another monomer, and the smaller is this rate ratio, the chain structure of more random structure has the copolymer.

According to the aforesaid monomer successive addition method, since uniformly mixed monomers are successively added into the polymerization system, it is possible to more decrease the polymerization selectivity of monomer in a polymer growth process by polymerization, different from a batch method, resulting in more random chain structure of the obtained copolymer. Further, the polymerization temperature can be stably maintained low because accumulation of polymerization reaction heat in the polymerization system is small.

In the case of a monomer successive addition method, polymerization is started by addition of an initiator in the state that generally 0.01-60 weight %, preferably 0.02-20 weight % and more preferably 0.05-10 weight % among the total using amount of the monomer presents as an initial monomer in a polymerization reaction vessel in advance. By setting the amount of the initial monomer in such a range, easily removed can be reaction heat generated in the initial reaction after starting polymerization resulting in preparation of a copolymer having a more random chain structure.

By continuing the reaction until a polymerization conversion ratio of the aforesaid monomer reaches to not less than 70%, preferably not less than 80% and more preferably not less than 90%, preparation of a copolymer having a more random chain structure results. Thereafter, the residual portion of the aforesaid monomer is discontinuously added to the reaction system, and the addition rate is determined in view of consumption rate of the monomer in the polymerization system.

The addition of the residual monomer is adjusted to finish in a range of 0.5-3 times, preferably 0.8-2 times and more preferably 1-1.5 times, of a time duration given by a relation $[(100-I) \times T/I]$, when a required time until the polymerization conversion ratio of the initial monomer reaches to 90% is T, and the ratio (%) of the initial monomer to the total monomer utilized is I. Specifically, the addition rates of the initial monomer and of the residual monomer are determined so that the addition time duration of the residual monomer is in a range of generally 0.1-30 hours, preferably 0.5-5 hours and more preferably 1-3 hours. Further, a polymerization conversion ratio of the total monomer immediately after the finish of the monomer addition is generally not less than 80%, preferably not less than 85% and more preferably not less than 90%. By setting a polymerization conversion ratio of the total monomer immediately after the finish of the monomer addition to the aforesaid range, obtained copolymer have a more random chain structure.

The polymerization method includes such as radical polymerization, anion polymerization and cation polymerization, and is not specifically limited. However, anion polymerization is preferred in view of polymerization operation, easiness of a hydrogenation reaction in the post process and mechanical strength of a finally obtained hydrocarbon type copolymer.

In the case of radical polymerization, block polymerization, solution polymerization, suspension polymerization and emulsion polymerization in the presence of an initiator, in a temperature range of generally 0-200° C. and preferably 20-150° C. can be employed, and in particular, in the case of prevention of impurity mixing in resin is required, block polymerization and suspension polymerization are preferred. As a radical initiator, utilized can be organic peroxides such as benzoyl peroxide, lauroyl peroxide and t-butyl-peroxy-2-ethylhexaate, azo compounds such as azobisbutyronitrile, 4,4-azobis-4-cyanopenoic acid and azodibenzoyl, water-soluble catalysts exemplified by potassium persulfate and ammonium persulfate and redox initiators.

In the case of anion polymerization, block polymerization, solution polymerization and slurry polymerization in the presence of an initiator, in a temperature range of generally 0-200° C., preferably 20-100° C. preferably and specifically preferably 20-80° C. can be employed, however, solution polymerization is preferred in view of removal of reaction heat. In this case, an inert solvent which can dissolve the polymer and the hydrogenation product thereof is utilized. Inert solvents utilized in solution reaction include, for example, aliphatic hydrocarbons such as n-butane, n-pentane, iso-pentane, n-hexane, n-heptane and iso-octane; alicyclic hydrocarbons such as cyclopentane, cyclohexane, methylcyclopentane, methylcyclohexane and decalin; and aromatic hydrocarbons such as benzene and toluene, and aliphatic hydrocarbons and alicyclic hydrocarbons among them can be utilized as it is as an inert solvent also for the hydrogenation reaction. These solvents can be utilized alone or in combination of two or more types, and are utilized at a ratio of 200-10,000 weight parts against 100 weight parts of the total using monomers.

As an initiator for the anion polymerization described above, usable are, for example, mono organolithium compounds such as n-butyl lithium, sec-butyl lithium, t-butyl lithium, hexyl lithium and phenyl lithum; and multi-functional organolithium compounds of such as dilithiomethane, 1,4-dilithiobutane and 1,4-dilithio-2-ethylcyclohexane.

In polymerization reaction, a polymerization accelerator and a randomizer (an additive to prevent a chain of certain one component from becoming long) can also be utilized. In the case of anion polymerization, for example, a Lewis base compound can be utilized as a randomizer. Specific examples of a Lewis base compound include, for example, ether compounds such as dimethyl ether, diethyl ether, diisopropyl ether, dibutyl ether, tetrahydrofuran, diphenyl ether, ethylene glycol diethyl ether and ethylene glycol methylphenyl ether; tertiary amine compounds such as tetramethylethylenediamine, trimethylamine, triethylamine and pyridine; alkali metal alkoxide compounds such as potassium-t-amyloxide and potassium-t-butyloxide; and phosphine compounds such as triphenylphsphine. These Lewis base compounds can be utilized each alone or in combination of two or more types.

Polymers obtained according to the above radical polymerization or anion polymerization can be recovered by means of commonly known methods such as a steam stripping method, a direct desolvation method and an alcohol coagulation method. Further, at the time of polymerization, in the case of utilizing an inert solvent in hydrogenation reaction, the polymer is not recovered from polymerization solution but can be supplied into hydrogenation process as it is.

In the case of performing hydrogenation of carbon-carbon double bonds in an unsaturated ring such as an aromatic ring and a cycloalkene ring or unsaturated bonds in a main chain of in copolymers before hydrogenation, the reaction method and reaction form are not specifically limited, and can be performed according to commonly known method. However, preferred is a hydrogenation method which can increase a hydrogenation degree as well as decrease a polymer chain cleaving reaction caused simultaneously with the hydrogenation, and listed is a method employing a catalyst containing at least one metal selected from nickel, cobalt, iron, titanium, rhodium, palladium, platinum, ruthenium and rhenium, in an organic solvent. As a hydrogenation catalyst, either a heterogeneous catalyst or a homogeneous catalyst can be utilized.

A heterogeneous catalyst can be utilized as a metal or a metal compound as it is, or by being carried in an appropriate carrier. Carriers include, for example, active carbon, silica, alumina, calcium carbonate, titania, magnesia, zirconia, diatomaceous earth and silicon carbide, and the carring amount of the catalyst is generally in a range of 0.01-80 weight % and preferably 0.05-60 weight %. As a homogeneous catalyst, utilized can be catalyst combining nickel, cobalt, titanium or iron compounds and organometallic compounds (such as organoaluminum compounds and organolithium compounds); or organometallic complex catalysts of such as rhodium, palladium, platinum, ruthenium and rhenium. As nickel, cobalt, titanium or iron compounds, utilized are, for example, acetylacetone salts, naphthenate salts, cyclopentadienyl compounds and cyclopentadienyl dichloro compounds of various types of metals. As organoaluminum compounds, suitably utilized are alkylaluminums such as triethylaluminum and triisobutylaluminum; halogenated aluminums such as diethylaluminum chloride and ethylaluminum dichloride; and alkylaluminum hydrides such as diisobutylaluminum hydride.

As examples of an organometallic complex catalyst, utilized are metal complexes such as γ-dichloro-π-benzene complexes, dichloro-tris(triphenylphosphine) complexes and hydride-chloro-triphenylphosphine complexes of the aforesaid each metal. These hydrogenated catalysts can be utilized each alone or in combination of two or more types, and the using amount is generally 0.01-100 parts preferably 0.05 -50 parts and more preferably 0.1-30 parts, based on weight against the polymer.

The hydrogenation reaction is generally performed at a temperature of 10-250° C., however, is preferably performed at a temperature of 50-200° C. and more preferably 80-180° C., for the reason of an increasing hydrogenation degree as well as decreasing a polymer chain cleaving reaction which is caused simultaneous with a hydrogenation reaction. Further, hydrogen pressure is generally 0.1-30 MPa, however, it is preferably 1-20 MPa and more preferably 2-10 MPa, with respect to easy operation in addition to the above reasons.

The hydrogenation rate of thus obtained hydrogenated compounds is generally not less than 90%, preferably not less than 95% and more preferably not less than 97%, based on 1H-NMR measurement, with respect to any of carbon-carbon unsaturated bonds of a main chain, carbon-carbon double bonds of an aromatic ring and carbon-carbon double bonds of an unsaturated ring. Such as a low double refraction property and thermal stability are deteriorated when the hydrogenation rate is low.

A method to recover a hydrogenated compound after finishing the hydrogenation reaction is not specifically limited. Generally, utilized can be a method in which the solvent is removed from the hydrogenated compound solution by means of direct drying after elimination of the residue of a hydrogenation catalyst by means of such as filtration and centrifugal separation, and a method in which the hydrogenated compound solution is poured into a poor solvent for the hydrogenated compound to coagulate the hydrogenated.

(Resin Composition)

In the invention, a resin composition comprising the polymer having the alicyclic structure containing an antioxidant is provided.

For the antioxidant, a phenol type antioxidant, a phosphor type antioxidant and a sulfur type antioxidant are usable, and among them the phenol type antioxidant, particularly an alkyl-substituted phenol type antioxidant, is preferable. By addition of these antioxidants, coloring and lowering of the strength of the molded material caused by the degradation by oxidation on the occasion of the molding can be prevented without lowering in the transparency and the low moisture absorption.

For the phenol type antioxidant, usually known ones ca be employed. For example, acrylate compounds described in Japanese Patent Tokkai Nos. 63-179953 and 1-168643 such as 2-t-butyl-6-(3-t-butyl-2-hydroxy-5-methylbenzyl)-4-methylphenyl acrylate and 2,4-di-t-amyl-6-(1-(3,5-di-t-amyl-2-hydroxyphenyl)ethyl)phenyl acrylate; an alkyl-substituted phenol compound such as octadecyl-3-(3,5-di-t-butyl-4-hydroxyphenyl) propionate, 2,2'-methylene -bis(4-methyl-6-t-butylphenol), 1,1,3-tris(2-methyl -4-hydroxy-5-t-butylphenyl )butane, 1,3,5-trimethyl-2,4,6-tris(3,5-di-t-butyl-4-hydroxybenzyl)benzene, tetrakis(methylene -3-(3',5'-di-t-butyl-4'-hydroxyphenylpropionate)methane, namely pentaerythrimethyl-tetrakis(3-(3,5-di-t-butyl-4-hydroxyphenylpropionate) and triethylene glycol bis-(3-(3-t-butyl-4-hydroxy-5-methylphenyl)propionate; and a triazine group-containing phenol compound such as 6-(4-hydroxy-3,5-di-t-butylanilino)-2,4-bisoctyl-1,3,5-triazine, 4-bisoctylthio-1,3, 5-triazine and 2-octylthio-4,6-bis-(3,5-di-t-butyl-4-oxyanilino)-1,3,5-triazine are cited.

For the phosphor type antioxidant, ones usually employed in the field of resin industry can be employed without any limitation. For example, monophosphite compounds such as triphenyl phosphate, diphenylisodecyl phosphate, phenylisodecyl phosphate, tris(nonylphenyl) phosphate, tris(dinonylphenyl) phosphate, tris(dinonylphenyl) phosphate, tris (2,4-di-t-butylphenyl) phosphate, and 10-(3,5-di-t-butyl-4-hydroxybenzyl)-9,10-dihydro-9-oxa-10-Phosphaphenanthrene-10-oxide; and diphosphite compounds such as 4,4'-butylidene-bis(3-methyl-6-t-butylphenyl-di-tridecyl phosphate and 4,4'-isopropyridene-bis (phenyl-di-alkyl($C_{12}$ to $C_{15}$) phosphate) are cited. Among them, the monophosphite compounds are preferable and tris (nonylphenyl) phosphate, tris(dinonylphenyl) phosphate and tris(2,4,-di-t-butylphenyl) phosphate are particularly preferable.

As the sulfur type antioxidant, for example, dilauryl 3,3-thiodipropionate, dimyrystyl 3,3'-thiodipropionate, distearyl 3,3-thiodipropionate, laurystearyl 3,3-dithiopropionate, pentaerythrytol-tetrakis-(β-laurylstearyl-thio-propionate and 3,9-bis-(2-dodecylthioethyl)-2,4,8,10-tetrakispiro[5,5]undecane are cited.

These antioxidants may be employed singly or in combination of two or more kinds. The adding amount of the antioxidant is optionally decided within the range in which the object of the invention is not vitiated; it is usually from 0.001 to 5 parts by weight and preferably from 0.01 to 1 part by weight to 100 parts by weight of the polymer having the alicyclic structure.

In the invention, a resin composition containing the polymer having the alicyclic structure and at least one selected from the group consisting of (1) a soft polymer, (2) an alcoholic compound and (3) an organic or inorganic filler is employed. By adding such the additives, occurrence of white turbid caused by standing for a long period under a high temperature and high humidity condition can be prevented without degradation in properties such as the transparency, low moisture absorption and mechanical strength.

Among the above-mentioned, (1) the soft polymer and (2) the alcoholic compound are excellent in the white turbid preventing effect and the transparency of the resin composition.

(1) Soft Polymer

The soft polymer to be employed in the invention is usually a polymer having a Tg of not more than 30° C. When the polymer shows plural Tgs, it is allowed that the lowest Tg is not more than 30° C.

The concrete examples of the soft polymer include an olefin type copolymer such as liquid polyethylene, polypropylene, poly-1-butene, ethylene.α-olefin copolymer, propylene.α-olefin copolymer, ethylene.propylene.diene copolymer (EPDM) and ethylene.propylene.styrene copolymer; an isobutylene type soft polymer such as polyisobutylene, isobutylene.isoprene rubber and isobutylene.styrene copolymer; a diene type soft polymer such as polybutadiene, polyisoprene, butadiene.styrene random copolymer, isoprene.styrene random copolymer, acrylonitrile.butadiene copolymer, acrylonitrile.butadiene.styrene copolymer, butadiene.styrene block copolymer, isoprene.styrene block copolymer, styrene.butadiene.styrene block copolymer, isoprene.styrene block copolymer and styrene.isoprene.styrene block copolymer; a silicon-containing soft polymer such as dimethylpolysiloxane, diphenylpolysiloxane and dihydroxypolysiloxane; a soft polymer composed of a α,β-unsaturated acid such as poly(butyl acrylate), poly(butyl methacrylate), poly(hydroxyethyl methacrylate), polyacrylamide, polyacrylonitrile and butyl acrylate.styrene copolymer; a soft polymer composed of a unsaturated alcohol and amine, an acyl derivative thereof or acetal such as poly(vinyl alcohol), poly(vinyl acetate), poly(vinyl stearate) and cetate.styrene copolymer; an epoxy type soft polymer such as poly(ethylene oxide), poly(propylene oxide) and epichlorohydrine rubber; a fluorine-containing soft polymer such as vinylidene fluoride type rubber and ethylene tetrafluoride.propylene rubber; and another soft polymer such as natural rubber, polypeptide, protein, a polyester type thermoplastic estramer, a vinyl chloride type thermoplastic estramer and a polyamide type thermoplastic estramer. The soft polymers may be one having a crosslinking structure and one introduced with a functional group by a modification reaction.

In the above soft polymers, the diene type soft polymer is preferable, particularly a hydride compound in which carbon-carbon unsaturated bond is hydride, is superior in the rubber elasticity, mechanical strength, softness and dispersing ability.

(2) Alcoholic Compound

The alcoholic compound is a compound having at least one non-phenolic hydroxyl group, and preferably at least one hydroxyl group and at least one ether bond or ester bond. Concrete examples of such the compound include an alcoholic ether and ester compounds such as a poly-valent alcohol for example di or more-valent alcohol, preferably tri or more-valent alcohol, and more preferably poly-valent alcohol having 3 to 8 hydroxyl groups, in which one of the hydroxyl group is etherized or esterized.

As the di- or more-valent alcohol, for example, poly(ethylene glycol), glycerol, trimethylolpropane, pentaerythrytol, diglycerol, triglycerol, dipentaerythrytol, 1,6,7-trihydroxy-2,2-di(hydroxymethyl)-4-oxo-heptane, sorbitol, 2-methyl-1,6,7-trihydroxy-2-hydroxymethyl-4-oxo-heptane, 1,5,6-trihydroxy-3-oxo -hexanepentaerythrytol and tris(2-hydroxyethyl)isocyanurate are cited, and the tri- or more-valent alcohol, particularly having 3 to 8 hydroxyl groups, are preferable. To obtain the alcoholic ester compound, glycerol, diglycerol and triglycerol are preferable, by which alcoholic ester compound containing α,β-diol can be synthesized.

Examples of such the alcoholic compound include a poly-valent alcoholic esterized compound such as glycerol monostearate, glycerol monolaurate, glycerol monobehenate, glycerol monostearate, glycerol distearate, glycerol dilaurate, pentaerythrytol monostearate, pentaerythrytol monolaurate, pentaerythrytol monobehenate, pentaerythrytol distearate, pentaerythrytol dilaurate, pentaerythrytol tristearate and dipentaerythrytol distearate; 3-(octyloxy)-1,2-propanediol, 3-(decyloxy)-1,2-propanediol, 3-(lauryloxy)-1,2-propanediol, 3-(4-nonylphenyloxy)-1,2-propanediol, 1,6-dihydroxy-2,2-di(hydroxymethyl)-7-(4-nonylphenyloxy)-4-oxo-eptane, an alcoholic ether compound obtained by reaction of a condensate of p-nonylphenyl ether with formaldehyde and glycidol, an alcoholic ether compound obtained by reaction of a condensate of p-octylphenyl ether with formaldehyde and crycidol, and an alcoholic ether compound obtained by reaction of a condensate of p-octylphenyl ether with dicyclopentadiene and crycidol are employable. These poly-valent alcoholic compounds are employed singly or in combination of two or more kinds thereof. The molecular weight of these poly-valent alcoholic compounds is usually from 500 to 2,000, preferably from 800 to 1,500 even though the molecular weight is not specifically limited.

(3) Organic or Inorganic Filler

As the organic filler, a usual organic polymer particle or a crosslinked organic polymer particle can be employed. For example, a particle or a crosslinked particle of a polyolefin such as polyethylene and polypropylene; a halogen-containing vinyl polymer such as poly(vinyl chloride) and poly(vinylidene chloride); a polymer derived from a α,β-unsaturated acid such as polyallylate and polymethacrylate; a polymer derived from a unsaturated alcohol such as poly(vinyl alcohol) and poly(vinyl acetate); a polymer derived from poly(ethylene oxide) or bisglycidol ether; an aromatic condensate polymer such as poly(phenylene oxide), polycarbonate and polysulfone; polyurethane; polyamide; polyester; aldehyde; aldehyde-phenol type resin; and natural polymer compound are employable.

As the inorganic filler, for example, a powder of a compound of an element of Group 1 of periodic table such as lithium fluoride and borax (sodium borate hydrate); a compound of an element of Group 2 such as magnesium carbonate, magnesium phosphate, calcium carbonate, strontium titanate and barium carbonate; a compound of an element of Group 4 such as titanium dioxide (titania) and titanium monoxide; a compound of an element Group 6 such as molybdenum dioxide and molybdenum trioxide; a compound of an element of Group 7 such as manganese chloride and manganese acetate; a compound of an element of Groups 8 to 10 such as cobalt, chloride and cobalt acetate; a compound of an element of Group 11 such as cuprous iodide; a compound of an element of Group 12 such as zinc oxide and zinc acetate; a compound of an element of Group 13 such as aluminum oxide (alumina), aluminum fluoride and aluminosilicate (alumina silicate, kaolin and kaolinite): a compound of an element of Group 14 such as silicon oxide (silica and silicagel); and a natural mineral such as graphite, carbon and glass; carnallite, kinite, mica (mica and golden mica) and bairose mineral are employable.

Tough the adding amount of the compounds of (1) to (3) is decided by the combination of the polymer having the alicyclic structure and the compound to be added, the glass transition point and the transparency of the composition is largely lowered when the adding amount is too large in general. When the adding amount is too small, white turbid tends to occur under the high temperature and high humid condition so that the composition becomes unsuitable to use for the optical material. The adding amount is usually from 0.01 to 10, preferably from 0.02 to 5, particularly preferably from 0.05 to 2, parts by weight to 100 parts by weight of the polymer having the alicyclic structure. When the adding amount is too small, the effect for preventing occurrence of the white turbid under the high temperature and high humidity condition cannot be obtained, and when the adding amount is too large, the heat resistivity and the transparency of the molded product are lowered.

Another additive such as a UV absorbent, a light stabilizer, a near infrared absorbent, a colorant such as a dye and a pigment, a slipping agent, a plasticizer, an antistatic agent and a fluorescent whitening agent may be added to the resin composition of the invention according to necessity. These additives may be employed singly or in a combination of two or more kinds thereof, and the adding amount is optionally decided within the range in which the object of the invention is not vitiated.

The resin composition according to the invention can be obtained by suitably mixing the foregoing raw materials. The mixing method is not specifically limited as long as the additives can be satisfactorily dispersed in the hydrocarbon type polymer by the method. For example, a method in which the resin is kneaded in a molten form by a mixer, double-axial kneader, rollers, brabender or extruder and a method in which the materials are dissolved in a suitable solvent and dispersed and solidified. When the double-axial kneader is employed, the molten mixture is usually extruded in a form of stick and cut into a suitable length by a strand cutter to form pellets for employing as the molding material.

(Optical Element)

The optical element according to the invention is obtained by molding the polymer having the alicyclic structure or the resin composition. Though the molding method is not specifically limited, a melt molding is preferable for obtaining a molded product excellent in the birefringency, the mechanical strength and the dimension precision. Examples of the melt molding method include a press molding, an extruding molding, and injection molding in which the injection molding is preferred from the viewpoint of the molding ability and the production efficiency. The molding condition is suitably decided according to the object and the method of the molding, for example, the rein temperature for the injection molding is usually selected within the range of from 150 to 400° C., preferably from 200 to 350° C., more preferably from 230 to 330° C. When the resin temperature is too low, the fluidity of the resin is lowered so as to cause a shrinkage and distortion, and when the temperature is too high, a silver streak and yellowish coloring of the molded product tend to be caused by thermal decomposition of the resin.

An optical element described in Item 5 is the optical element described in Item 1, wherein the resin containing olymers having an alicyclic structure includes block copolymers having poloymer block [A] containing a repeating unit [1] represented by a formula (11) and poloymer block [B] containing a repeating unit [1] and a repeating unit [2] represented by a formula (12) and/or a repeating unit [3] represented by a formula (13) and the block copolymers satisfy the relationship of a>b, where a is a mol fraction (mol %) of the repeating unit [1] in the polymer block [A] and b is a mol fraction (mol %) of the repeating unit [1] in the polymer block [B].

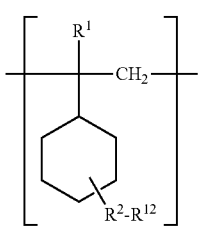

Formula (11)

(in the formula, $R^1$ represents a hydrogen atom or an alkyl group having a carbon number of 1-20, $R^2$-$R^{12}$ each independently represent a hydrogen atom, an alkyl group having a carbon number of 1-20, a hydroxyl group, an alkoxy group having a carbon number of 1-20 or a halogen group. Herein, the aforesaid $R^2$-$R^{12}$ are $R^2$, $R^3$, $R^4$, $R^5$, $R^6$, $R^7$, $R^8$, $R^9$, $R^{10}$, $R^{11}$ and $R^{12}$. Hereinafter, it is similar.)

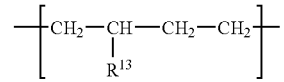

Formula (12)

(in the formula, $R^{13}$ represents a hydrogen atom or an alkyl group having a carbon number of 1-20.)

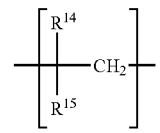

Formula (13)

(in the formula, $R^{14}$ and $R^{15}$ each independently represent a hydrogen atom or an alkyl group having a carbon number of 1-20.)

A preferable structure of repeating unit [1] represented by above formula (11) is one in which $R^1$ is a hydrogen atom or a methyl group and all of $R^2$-$R^{12}$ are hydrogen atoms. The transparency and mechanical strength are superior when the content of repeating unit [1] in polymer block [A] is in the above range. In polymer block [A], the residual parts except aforesaid repeating unit [1] are repeating units arising from chain conjugated dienes or chain vinyl compounds which have been hydrogenated.

Polymer block [B] contains aforesaid repeating unit [1] and repeating unit [2] represented by following formula (12) and/or [3] represented by following formula (13). The content of repeating unit [1] in polymer block [B] is preferably 40-95 mol % and more preferably 50-90 mol %. The transparency and mechanical strength are superior when the content of repeating unit [1] is in the above range. When a mol fraction of repeating unit [2] in polymer block [B] is m2 (mol %) and a mol fraction of repeating unit [3] is m3 (mol %), 2×m3+m2 is preferably not less than 2 mol %, more preferably 5-60 mol % and most preferably 10-50 mol %.

A preferable structure of repeating unit [2] represented by above formula (12) is one in which $R^{13}$ is a hydrogen atom or a methyl group.

A preferable structure of repeating unit [3] represented by above formula (13) is one in which $R^{14}$ is a hydrogen atom and $R^{15}$ is a methyl group or an ethyl group.

The mechanical strength is decreased when the content of aforesaid repeating unit [2] or repeating unit [3] in polymer block [B] is excessively small. Therefore, transparency and mechanical strength are superior when the content of repeating unit [2] and repeating unit [3] is in the above range. Polymer block [B] may contain repeating unit [X] represented by. following formula (X). The content of repeating unit [X] is in a range not to damage the characteristics of a block copolymer of this invention, and is preferably not more than 30 mol % and more preferably not more than 20 mol %, based on the total block copolymer.

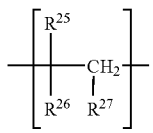

Formula (X)

(in the formula, $R^{25}$ represents a hydrogen atom or an alkyl group having a carbon number of 1-20, $R^{26}$ represents a nitrile group, an alkoxycarbonyl group, a formyl group, a hydroxycarbonyl group or a halogen group, and $R^{27}$ represents a hydrogen atom. $R^{25}$ and $R^{27}$ may represent an acid anhydride group or an imido group by bonding to each other.)

Further, polymer block [B] utilized in this invention preferably satisfy the relationship of a>b, when the mol fraction of repeating unit [1] in polymer block [A] is a, and the mol fraction of repeating unit [1] in polymer block [B] is b. Thereby, transparency and mechanical strength are superior.

Further, with respect to block copolymer utilized in this invention, the ratio ma/mb is preferably 5/95-95/5, more preferably 30/70-70/30 and most preferably 40/60-60/40, when a mol number of total repeating units constituting block [A] is ma and a mole number of total repeating units constituting block [B] is mb. Mechanical strength and heat resistance are superior when ma/mb is in the above range.

The molecular weight of an block copolymer utilized in this invention is preferably in a range of 10,000-300,000, more preferably 15,000-250,000 and most preferably 20,000-200,000 as a polystyrene (or polyisoprene) equivalent weight average molecular weight (hereinafter, described as Mw) which is measured by means of gel permeation chromatography employing tetrahydrofuran (THF) as a solvent. The balance of mechanical strength, heat resistance and a molding property is superior when Mw of a block copolymer is in the above range.

The molecular weight distribution of a block copolymer can be appropriately selected depending on the objective of the application, however, it is preferably not more than 5, more preferably not more than 4 and most preferably not more than 3, as a ratio (Mw/Mn) of a polystyrene (or polyisoprene) equivalent weight average molecular weight which is measured by means of GCP (hereinafter referred to as Mw) to a number average molecular weight (Mn). Mechanical strength and heat resistance are superior when Mw/Mn is in this range.

The glass transition temperature (Tg) of the copolymer may be suitably selected depending. on the objective of the application, however, is preferably 70-200° C., more preferably 80-180° C. and most preferably 90-160° C., as a high temperature side value measured by a differential scanning type thermal analyzer (hereinafter, described as DSC).

The above-described block copolymer utilized in this invention is provided with polymer block [A] and polymer block [B], and may be any of a di-block copolymer of ([A]-[B]) form, a tri-block copolymer of ([A]-[B]-[A]) or ([B]-[A]-[B]) and a block copolymer in which at least 4 blocks of polymer block [A] and polymer block [B] are bonded alternately. Further, it mey be a block copolymer in which these blocks are bonded in a radial form.

Block copolymers utilized in this invention can be obtained by the following methods. Listed is a method in which a polymer block having a repeating unit arising from an aromatic vinyl compound and/or an alicyclic vinyl compound, and a polymer block having a repeating unit arising from a vinyl type monomer are prepared by polymerizing a mixture of a monomer mixture containing an aromatic vinyl compound and/or an alicyclic vinyl compound, and a monomer mixture containing a vinyl type monomer (except aromatic vinyl compounds and alicyclic vinyl compounds), followed by hydrogenation of aromatic rings and/or aliphatic rings in said block copolymers. Further, listed is a method in which a monomer mixture containing a saturated alicyclic vinyl compound and a vinyl type monomer (except aromatic vinyl compounds and alicyclic vinyl compounds) are polymerized to prepare block copolymer having a repeating unit arising from an alicyclic vinyl compound and a repeating unit arising from a vinyl type compound. Among them, more preferable to obtain a block copolymer of this invention is, for example, the following method.

(1) In the first method, first, polymer block [A'] containing a repeating unit arising from an aromatic vinyl compound and/or an alicyclic vinyl compound which has unsaturated bonds in the ring is prepared by polymerizing a monomer mixture [a'] containing not less than 50 mol % of an aromatic vinyl compound and/or an alicyclic vinyl compound which has unsaturated bonds in the ring. Polymer block [B'] is prepared by polymerizing a monomer mixture [b'] which contains not less than 2 mol % of a vinyl type monomer (except aromatic vinyl compounds and alicyclic vinyl compounds), and containing an aromatic vinyl compound and/or an alicyclic vinyl compound which has unsaturated bonds in the ring at a ratio less than that in monomer mixture [a']. After preparing a block copolymer provided with aforesaid polymer block [A'] and polymer block [B'] via at least these process, aromatic rings and/or alicyclic rings in said block copolymer are hydrogenated.

(2) In the second method, first, polymer block [A] containing a repeating unit arising from an saturated alicyclic vinyl compound by polymerizing a monomer mixture containing not less than 50 mol % of an saturated alicyclic vinyl compound. Polymer block [B] containing a repeating unit arising from a saturated alicyclic vinyl compound and a repeating unit arising from a vinyl monomer is prepared by polymerizing a monomer mixture [b] which contains not less than 2 mol % of a vinyl type monomer (except aromatic vinyl compounds and alicyclic vinyl compounds), and containing a saturated alicyclic vinyl at a ratio less than that in monomer mixture [a]. A block copolymer provided with aforesaid polymer block [A] and polymer block [B] via at least these process.

Among the above methods, above-described method (1) is more preferred, with respect to easy availability of monomers, polymerization yield, easiness of introducing a repeating unit [1] into polymer block [B'].

Specific examples of aromatic vinyl compounds in above method (1) include such as styrene, α-methylstyrene, α-ethylstyrene, α-propylstyrene, α-isopropylstyrene, α-t-butylstyrene, 2-methylstyrene, 3-methylstyrene, 4-methylstyrene, 2,4-diisopropylstyrene, 4-t-butylstyrene, 5-t-butyl-2-methylstyrene, monochlorostyrene, dichlorostyrene, monofluorostyrene and 4-phenylstyrene, as well as those having substituents such as a hydroxyl group and an alkoxy group therein. Among them, preferable are such as 2-methylstyrene, 3-methylstyrene and 4-methylstyrene.

Specific examples of unsaturated alicyclic vinyl compounds in above method (1) include such as cyclohexenyl ethylene, α-methylcyclohexenyl ethylene and α-t-butylcyclohexenyl ethylene, as well as those having substituents such as a halogen group, an alkoxy group or a hydroxyl group therein.

These aromatic vinyl compounds and alicyclic vinyl compounds can be utilized each alone or in combination of two or more types. However, it is more preferable, in this invention, to utilize an aromatic vinyl compound in either of monomer mixtures of [a'] and [b'], and, in particular, more preferable to utilize α-methylstyrene.

Vinyl monomers utilized in the above method include chain vinyl compounds and chain conjugated diene compounds.

Specific examples of chain vinyl compounds include chain olefin monomers such as ethylene, propylene, 1-butene, 1-pentene and 4-methyl-1-pentene, and, among them, most preferable are ethylene, propylene and 1-butene.

Chain conjugated diene compounds include, for example, 1,3-butadiene, isoprene, 2,3-dimethyl-1,3-butadiene, 1,3-pentadiene and 1,3-hexadiene. Chain conjugated dienes, among these chain vinyl compounds and chain conjugated dienes, are preferred, and butadiene and isoprene are most preferred. These chain vinyl compounds and chain conjugated dienes can be utilized each alone or in combination of two or more types.

In the case of utilizing a monomer mixture containing the above-described monomers, a polymerization reaction may be performed by means of any polymerization method such as radial polymerization, anion polymerization or cation polymerization, and preferably by means of anion polymerization and most preferably by means of living anion polymerization in the presence of an inert solvent.

Anion polymerization is performed in the presence of a polymerization initiator in a temperature range of generally 0-200° C., preferably 20-100° C. and most preferably 20-80° C. As initiators, utilized can be, for example, mono-organolithium compounds such as n-butyl lithium, sec-butyl lithium, t-butyl lithium, hexyl lithium and phenyl lithium; and multifunctional organolithium compounds such as dilithiomethane, 1,4-dilithiobutane and 1,4-dilithio-2-ethylcyclohexane.

Inert solvents utilized include, for example, aliphatic hydrocarbons such as n-butane, n-pentane, iso-pentane, n-hexane, n-heptane and iso-octane; alicyclic hydrocarbons such as cyclopentane, cyclohexane, methylcyclopentane, methylcyclohexane and decalin; and aromatic hydrocarbons such as benzene and toluene, and aliphatic hydrocarbons and alicyclic hydrocarbons among them can be utilized as it is as an inert solvent also for the hydrogenation reaction. These solvents can be utilized each alone or in combination of two or more types, and are utilized at a ratio of 200-10,000 weight parts against 100 weight parts of the total using monomers.

At the time of polymerizing each polymer block, a polymerization accelerator or a randomizer can be utilized to prevent a certain one component chain from growing long. In particular, in the case of performing a polymerization reaction by means of anion polymerization, such as a Lewis base compound can be utilized as a randomizer. Specific examples of a Lewis base compound include, ether compounds such as dimethyl ether, diethyl ether, diisopropyl ether, dibutyl ether, tetrahydrofuran, diphenyl ether, ethylene glycol diethyl ether and ethylene glycol methylphenyl ether; tertiary amine compounds such as tetramethylethylenediamine, trimethylamine, triethylamine and pyridine; alkali metal alkoxide compounds such as potassium-t-amyloxide and potassium-t-butyloxide; and phosphine compounds such as triphenylphsphine. These Lewis base compounds can be utilized each alone or in combination of two or more types.

A method to preparation a block copolymer by means of living anion polymerization includes commonly known methods such as a consecutive addition polymerization reaction method and a coupling method, and in this invention, a consecutive addition polymerization reaction method is preferably employed.

In the case of preparing the above block copolymer provided with polymer block [A'] and polymer block [B'] by means of a consecutive addition polymerization method, a process to obtain polymer block [A'] and a process to obtain polymer block [B'] are performed successively in order. Specifically, in an inert solvent, polymer block [A'] is prepared by polymerizing monomer mixture [a'] in the presence of the above-described living anion polymerization catalyst, and polymer block [B'] connected to polymer block [A'] is prepared by continuing polymerization by successively adding monomer mixture [b'] into the reaction system. Further, if desired, monomer mixture [a'] is added to perform polymerization resulting in preparation of a tri-block substance by connecting polymer block [A'], then monomer mixture [b'] is further added to perform polymerize resulting in preparation of a tetra-block substance.

The obtained block copolymer is recovered by means of commonly known methods such as a steam stripping method, a direct desolvation method and an alcohol coagulation method. Further, at the time of polymerization, in the case of utilizing an inert solvent in a hydrogenation reaction, it is not necessary to recover the polymer from polymerization solution because the polymerization solution can be utilized in the hydrogenation process as it is.

Block copolymers provided with polymer block [A] and polymer block [B'], which is prepared by aforesaid method (1), are preferably those having a repeating unit of the following structure.

Preferable polymer block [A'] constituting block copolymer of before hydrogenation is a polymer block containing not less than 50% of repeating unit [4] represented by the following formula (4).

Formula (14)

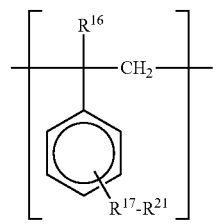

(in the formula, $R^{16}$ represents a hydrogen atom or an alkyl group having a carbon number of 1-20, $R^{17}$-$R^{11}$ each independently represent a hydrogen atom, an alkyl group having a carbon number of 1-20, a hydroxyl group, an alkoxy group having a carbon number of 1-20 or a halogen group. Herein, the aforesaid $R^{17}$-$R^{21}$ represent $R^{17}$, $R^{18}$, ... and $R^{21}$.

Further, preferable polymer block [B'] necessarily contains the aforesaid repeating unit [4], and provided with at least either one of repeating unit [5] represented by following formula (5) or repeating unit [6] represented by following formula (6). Further, a'>b', when mol fraction of repeating unit [4] in polymer block [A'] is a' and mol fraction of repeating unit [4] in polymer block [B'] is b'.

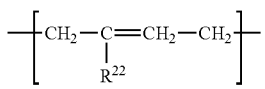

Formula (15)

(in the formula, $R^{22}$ represents a hydrogen atom or an alkyl group having a carbon number of 1-20.)

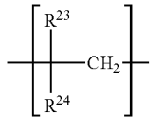

Formula (16)

(in the formula, $R^{23}$ represents a hydrogen atom or an alkyl group having a carbon number of 1-20, and $R^{24}$ represents a hydrogen atom or an alkyl group or an alkenyl group having a carbon number of 1-20)

Further block [B'] may contain repeating unit [Y] represented by following formula (Y).

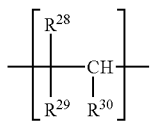

Formula (Y)

(in the formula, $R^{28}$ represents a hydrogen atom or an alkyl group having a carbon number of 1-20, $R^{29}$ represents a nitrile group, an alkoxycarbonyl group, a formyl group, hydroxycarbonyl group or a halogen group, or $R_{29}$ and $R_{30}$ may form an acid anhydride group or an imido group by bonding to each other.)

Further, a preferable block copolymer before hydrogenation is one having ratio ma/mb of preferably 5/95-95/5, more preferably 30/70-95/5 and most preferably 40/60-90/10, when a mol number of total repeating units constituting block [A'] is ma' and a mole number of total repeating units constituting block [B'] is mb'. The mechanical strength and heat resistance are superior when ma/mb is in the above range.

The molecular weight of a block copolymer before hydrogenation is preferably in a range of 12,000-400,000, more preferably 19,000-350,000 and most preferably 25,000-300,000 as a polystyrene (or polyisoprene) equivalent Mw which is measured by means of GCP employing THF as a solvent. Mechanical strength is decreased when Mw of a block copolymer is excessively small while hydrogenation degree is decreased when Mw of a block copolymer is excessively large.

The molecular weight distribution of a block copolymer before hydrogenation can be appropriately selected depending on the objective of the application, however, it is preferably not more than 5, more preferably not more than 4 and most preferably not more than 3, as a ration (Mw/Mn) of a polystyrene (or polyisoprene) equivalent molecular weight Mw to Mn, which are measured by means of GCP. The hydrogenation degree is improved when Mw/Mn is in this range.

The Tg of a block copolymer before hydrogenation may be suitably selected depending on the objective of the application, however, is preferably 70-150° C., more preferably 80-140° C. and most preferably 90-130° C., as a high temperature side value measured by means of DSC.

The reaction method and reaction form of performing hydrogenation of carbon-carbon unsaturated bonds in an unsaturated ring of such as an aromatic ring and a cycloalkene ring and unsaturated bonds in a main chain or a side chain, in the aforesaid block copolymer before hydrogenation, are not specifically limited, and can be performed according to commonly known methods. However, preferred is a hydrogenation method which can increase a hydrogenation degree as well as decrease a polymer chain cleaving reaction, and listed is a method employing a catalyst containing at least one metal selected from nickel, cobalt, iron, titanium, rhodium, palladium, platinum, ruthenium and rhenium, in an organic solvent. As a hydrogenation catalyst, either a heterogeneous catalyst or a homogeneous catalyst can be utilized.

A heterogeneous catalyst can be utilized as a metal or a metal compound as it is, or by being carried in an appropriate carrier. Carriers include, for example, active carbon, silica, alumina, calcium carbonate, titania, magnesia, zirconia, diatomaceous earth and silicon carbide, and the carring amount of the catalyst is generally in a range of 0.01-80 weight % and preferably 0.05-60 weight %. As a homogeneous catalyst, utilized can be catalyst combining nickel, cobalt, titanium or iron compounds and organometallic compounds (such as organoaluminum compounds and organolithium compounds); or organometallic complex catalysts of such as rhodium, palladium, platinum, ruthenium and rhenium. As nickel, cobalt, titanium or iron compounds, utilized are, for example, acetylacetone salts, naphthenate salts, cyclopentadienyl compounds and cyclopentadienyl dichloro compounds of various types of metals. As organoaluminum compounds, suitably utilized are alkylaluminums such as triethylaluminum and triisobutylaluminum; halogenated aluminum such as diethylaluminum chloride and ethylaluminum dichloride; and hydrogenated alkylaluminum such as diisobutylaluminum hydride.

As examples of an organometallic complex catalyst, utilized are metal complexes such as γ-dichloro-π-benzene complexes, dichloro-tris(triphenylphosphine) complexes and hydride-chloro-triphenylphosphine complexes of the aforesaid each metal. These hydrogenation catalysts can be utilized each alone or in combination of two or more types, and the using amount is generally 0.01-100 weight parts preferably 0.05-50 weight parts and more preferably 0.1-30 weight parts, per 100 weight parts of the polymer.

The hydrogenation reaction is generally performed at a temperature of 10-250° C., however, is preferably performed at a temperature of 50-200° C. and more preferably 80-180° C., for the reason of an increasing hydrogenation degree as well as decreasing a polymer chain cleaving reaction which is caused simultaneous with a hydrogenation reaction. Further, hydrogen pressure is generally 0.1-30 MPa, however, it is preferably 1-20 MPa and more preferably 2-10 MPa, with respect to easy operation in addition to the above reasons.

The hydrogenation degree of thus obtained hydrogenated compounds is preferably not less than 90%, more preferably not less than 95% and most preferably not less than 97%, based on 1H—NMR measurement, with respect to both of carbon-carbon unsaturated bonds of a main chain and a side chain, and carbon-carbon unsaturated bonds of an aromatic ring or a cycloalkene ring. Such as a low double refraction property and thermal stability of an obtained copolymer are deteriorated when the hydrogenation degree is low.

After finishing the hydrogenation reaction, the block copolymer can be recovered by such as a method in which the solvent is removed by means of direct drying after elimination of a hydrogenation catalyst from the reaction solution by means of such as filtration and centrifugal separation, and a method in which the hydrogenated compound solution is poured into a poor solvent for the hydrogenated compound to coagulate the hydrogenated compound.

In the aforesaid polymer according to this invention, various types of compounding ingredients can be appropriately blended. Compounding ingredients which can be blended in a block copolymer are not specifically limited and include stabilizers such as an antioxidant, a thermal stabilizer, a light fastness stabilizer, a weather-proofing stabilizer, a UV absorbent and an infrared absorbent; resin modifiers such as a sliding agent and a plastisizer; colorants such as dye and pigment; anti-static agents, non-flammable agents and fillers. These compounding ingredients can be utilized alone or in combination of two or more types, and the blending amount is selected in a range not disturbing the effects of this invention.

In this invention, it is preferable to blend an anti-oxidant, a UV absorbent and a light fastness stabilizer among the above compounding ingredients in a polymer. Anti-oxidants include such as phenol type anti-oxidants, phosphor type anti-oxidants and sulfur type anti-oxidants, and phenol type anti-oxidants, specifically alkyl-substituted phenol type anti-oxidants, are preferable among them. By blending these anti-oxidants, prevented can be coloring or strength decrease of a lens, due to oxidation deterioration at the time of molding, without deterioration of the transparency and heat resistance. These anti-oxidants can be utilized alone or in combination of two or more types, and the blending amount is selected in a range not disturbing the effects of this invention. It is preferably 0.001-5 weight parts and more preferably 0.01-1 weight parts, against 100 weight parts of the polymer.

UV absorbents include benzophenone type UV absorbents such as 2,4-dihydroxybenzophenone, 2-hydroxy-4-methoxy-benzophenone, 2,2'-dihydroxy-4-methoxybenzophenone, 2,2'-dihydroxy-4,4'-dimethoxybenzophenone, 2-hydroxy-4-methoxy-2'-benzophenone, 2-hydroxy-4-methoxy-5-sulfobenzophenone trihydrate, 2-hydroxy-4-n-octoxybenzophenone, 2,2',4,4'-tetrahydroxybenzophenone, 4-dodecyloxy-2-hydroxybenzophenone and bis(5-benzoyl-4-hydroxy-2-methoxyphenyl)methane; and benzotriazole type UV absorbents such as 2-(2'-hydroxy-5'-methylphenyl)benzotriazole, 2-(2H-benzotriazole-2-il)-4-methyl-6-(3,4,5,6-tetrahydrophthalimidylmethyl)phenol, 2-(2H-benzotriazole-2-il)-4,6-bis(1-methyl-1-phenylethyl)phenol, 2-(2'-hydroxy-3'5'-di-tertiary-butylphenyl)benzotriazole, 2-(2'-hydroxy-3'-tertiary-butyl-5'-methylphenyl)-5-chlorobenzotriazole, 2-(2'-hydroxy-5'-tertiary-octylphenyl)benzotriazole, 2-(2'-hydroxy-3'5'-di-tertiary-amylphenyl)benzotriazole, 2-[2'-hydroxy-3'-(3",4",5",6"-tetrahydrophthalimidomethyl)-5'-methylphenyl]benzotriazole and 2,2'-methylenebis[4-(1,1,3,3-tetramethylbutyl)-6-(2H-benzotriazle-2-il)phenol]. Among them, preferable are 2-(2'-hydroxy-5'-methylphenyl)benzotriazole, 2-(2H-benzotriazole-2-il)-4-methyl-6-(3,4,5,6-tetrahydrophthalimidylmethyl)phenol and 2-(2H-benzotriazole-2-il)-4,6-bis(1-methyl-1-phenylethyl)phenol, with respect to such as heat resistance and low volatility.

Light fastness stabilizers include benzophenone type light fastness stabilizers, benzotriazole type light fastness stabilizers and hindered amine type light fastness stabilizers, and, in this invention, preferably utilized are hindered amine type light fastness stabilizers, with respect to transparency and an anti-coloring property of a lens. Among hindered amine type light fastness stabilizers (hereinafter, abbreviated as a HALS), those having a polystyrene equivalent Mn, measured by means of GPC employing THF as a solvent, of preferably 1000-10000, more preferably 2000-5000 and most preferably 2800-3800. When Mn is excessively small, a predetermined amount may not be blended due to evaporation at the time of blending said HALS in a polymer by thermal fusion kneading, or foams and silver streaks may generate at the time of thermal fusion molding in the ejection molding, resulting in decrease of manufacturing stability. Further, volatile gases may be generated from a lens when the lens is used for a long period keeping an on-state of a lamp. On the contrary, when Mn is excessively large, the dispersibility of HALS in a block copolymer is decreased to decrease transparency of a lens which results in deterioration of the improvement effect of light fastness. Therefore, in this invention, obtained can be lenses exhibiting excellent manufacturing stability, low gas generation and transparency by setting Mn of HALS in the above range.

Specific examples of such a HALS include high molecular weight HALS in which a plural number of piperidine rings are bonded via a triazine skeleton such as N,N',N'',N'''-tetrakis-[4,6-bis-{butyl-(N-methyl-2,2,6,6-tetramethylpiperidine-4-il)amino}-triazine-2-il]-4,7-diazadecane-1,10-diamine, a polycondensation compound of dibutylamine, 1,3,5-triazine and N,N'-bis(2,2,6,6-tetramethyl-4-piperidyl)butylamine, poly[{(1,1,3,3-tetramethylbutyl)amino-1,3,5-triazine-2,4-diil}{(2,2,6,6-tetramethyl-4-piperidyl)imino}hexamethylene{(2,2,6,6-tetramethyl-4-piperidyl)imino}], a polycondensation compound of 1,6-hexadiamine-N,N'-bis(2,2,6,6-tetramethyl-4-piperidyl) and morphorine-2,4,6-trichloro-1,3,5-triazine and poly[(6-morphorino-s-triazine-2,4-diil)(2,2,6,6-tetramethyl-4-piperidyl)imino]-hexamethylene[((2,2,6,6-tetramethyl-4-piperidyl)imino];
high molecular weight HALS in which a piperidine rings are bonded via a ester bonding such as a polymerization compound of dimethylsuccinate and 4-hydroxy-2,2,6,6-tetramethyl-1-piperidineethanol, a mixed esterified compound of 1,2,3,4-butanetetracarboxylic acid, 1,2,2,6,6-pentamethyl-4-piperidinol and 3,9-bis(2-hydroxy-1,1-dimethyl)-2,4,8,10-tetraoxasupiro[5,5]undecane.

Among them, preferred are polymers having Mn of 2000-5000, such as a polycondensation compound of dibutylamine, 1,3,5-triazine and N,N'-bis(2,2,6,6-tetramethyl-4-piperidyl)butylamine; poly[{(1,1,3,3-tetramethylbutyl)amino-1,3,5-triazie-2,4-diil}{(2,2,6,6-tetramethyl-4-piperidyl)imino}hexamethylene{(2,2,6,6-tetramethyl-4-piperidyl)imino}], a polymerization compound of dimethylsuccinate and 4-hydroxy-2,2,6,6-tetramethyl-1-piperidineethanol.

The blending amount of UV absorbent and HALS described above in a block copolymer according to this invention is preferably 0.01-20 weight parts, more preferably 0.02-15 weight parts and most preferably 0.05-10 weight perts based on 100 weight parts of the polymer compound. The improvement effect of light fastness may not be obtained sufficiently resulting ink coloring in such as the case of long period outdoor use, when the addition amount is excessively small. While, when the blending amount of HALS is excessively large, a part of the HALS may be converted to a gas to be generated, or dispersibility of the HALS may be decreased, resulting in decrease of transparency of a lens.

Further, by blending a soft polymer having the lowest glass transition temperature of not higher than 30° C., it is possible to prevent turbidity under an environment of high temperature and high humidity for a long period without deteriorating such as transparency, heat resistance and mechanical strength.

Specific examples of the above soft polymers include olefin type soft polymer such as polyethylene, polypropyrene, ethylene-α-olefin copolymer and ethylene-propyrene-diene copolymer (EDPM); isobutylene type soft copolymers such as polyisobutylene, isobutylene-isoprene rubber and isobutylene-styrene copolymer; diene type soft copolymers such as polybutadiene, polyisoprene, butadiene-styrene random copolymer, isoprene-styrene random copolymer, acrylonitrile-butadiene copolymer, acrylonitrile-butadiene-styrene copolymer, butadiene-styrene-block copolymer, styrene-butadiene-styrene-block copolymer, isoprene-styrene-block copolymer and styrene-isoprene-styrene-block copolymer; silicon containing type soft polymers such as dimethyl polysiloxane and diphenyl polysiloxane; acryl type soft polymers such as polybutyl acrylate, polybutyl methacrylate and polyhydroxyethyl methacrylate; epoxy type soft polymers such as polyethyleneoxide, polypropyreneoxide and epichlorohydrine rubber; fluoride type soft polymers such as fluorovinyl type rubber and tetrafluoroethylene-propyrene rubber; other soft polymers such as natural rubber, polypeptide, protein, polyester type thermal plastic elastomers, vinylchloride type elastomers and polyamido type thermoplastic elastomers. These soft elastomer may be provided with a cross-linking structure or introduced with a functional group by a modification reaction.

Diene type soft polymers are preferred among the soft polymers described above, and, in particular, hydrogenated compounds, in which carbon-carbon unsaturated bonds of said soft polymers are hydrogenated, are superior with respect to rubber elasticity, mechanical strength, flexibility and dispersibility. The blending amount of a soft polymer differs depending on types of the compound, however, generally, the glass transition temperature or transparency may be decreased remarkably resulting in being unusable as a lens when the blending amount is too large. While turbidity of a molded product may generates under high temperature and high humidity when the blending amount is excessively small. The blending amount is preferably 0.01-10 weight parts, more preferably 0.02-5 weight parts and specifically preferably 0.05-2 weight parts against 100 weight parts of the block copolymer.

As the method for forming the block copolymer composition by adding the additives to the block copolymer, for example, a method in which the block copolymer in a molten state is kneaded with the additives by a mixer, double-axial kneader, rollers, brabender or extruder and a method in which the materials are dissolved in a suitable solvent and dispersed and solidified. When the double-axial kneader is employed, the molten mixture is usually extruded in a form of stick and cut into a suitable length by a pelettizer to form pellets for employing as the molding material.

Other than the above resin, for example, a resin containing a norbonene type open ring (hydrogen) polymer described in Japanese Patent Tokkai No. 2003-73460 can be employed for the material of the optical element according to the invention.

An optical pickup apparatus described in Item 9 is an optical pickup comprises:

a light source emitting light of wavelength λ satisfying the relation of 350 nm≦λ≦450 nm, and an optical element arranged at a position where the light flux emitted from the light source passes; wherein the optical pickup apparatus conducts recording and/or reproducing information by converging the light flux having passed through the optical element onto a information recording plane of an optical information recording medium, wherein the optical element irradiated with, comprising:

a synthetic resin base material; and an antireflection film provided on the synthetic resin base material and including a contact layer being in contact with the synthetic resin base material, wherein the contact layer is a film made of a material containing no oxygen atom or a film made of a mixed material of a material containing no oxygen atom and a material containing an oxygen atom in which the mixed material contains the material containing an oxygen atom 10% or less.

An optical pickup apparatus described in Item 10 is the optical pickup apparatus described in Item 9, wherein the material containing no oxygen atom is selected from magnesium fluoride, lanthanum fluoride, neodymium fluoride, cerium fluoride, calcium fluoride, cryolite ($Na_3AlF_6$), lead fluoride, lithium fluoride, thorium fluoride, silicon nitride, and zinc sulfide.

An optical pickup apparatus described in Item 11 is the optical pickup apparatus described in Item 9, wherein the antireflection film comprises plural layers and all of the plural layers are a film made of a material containing no oxygen atom or a film made of a mixed material of a material containing no oxygen atom and a material containing an oxygen atom in which the mixed material contains the material containing an oxygen less than 10%.

An optical pickup apparatus described in Item 12 is the optical pickup apparatus described in Item 9, wherein the antireflection film comprises plural layers and at leas one layer of other layers except the contact layer is a film made of a material containing an oxygen atom.

An optical pickup apparatus described in Item 13 is the optical pickup apparatus described in Item 9, wherein the antireflection film comprises plural layers and the uppermost layer is a film made of a material containing an oxygen atom.

An optical pickup apparatus described in Item 14 is the optical pickup apparatus described in anyone of Items 9 to 13, wherein the synthetic resin base material is a base material made of a resin containing a polymer including an alicyclic type structure.

An optical pickup apparatus described in Item 15 is the optical pickup apparatus described in Item 14, wherein the resin containing polymers having an alicyclic structure contains repeating unit (a) having an alicyclic structure represented by following general formula (1) and repeating unit (b) comprising a chain structure represented by following general formula (2) and/or (3) so as to make the sum content of not less than 90 weight %, and, further, make the content of repeating unit (b) not less than 1 weight % and less than 10 weight % among whole repeating units of a polymer having a weight average molecular weight (Mw) of 1,000 to 1,000, 000, and the chain of the repeating unit (a) satisfies the following formula: (That is, $A \leq 0.3 \times B$, where $A$=(a weight average molecular weight of a repeating unit chain having an alicyclic type structure), and $B$=(a weight average molecular weight of a polymer having an alicyclic type structure (Mw)× (the number of repeating units having an alicyclic type structure/the number of whole repeating units constructing the alicyclic type structure), General formula (1)

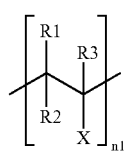

-continued

General formula (2)

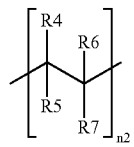

General formula (3)

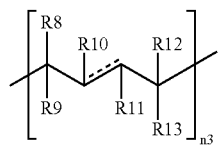

where in formula (1), X represents an alicyclic hydrocarbon group, R1-R13 in formulas (1), (2) and (3) each independently represent a hydrogen atom, a chain hydrocarbon group, a halogen atom, an alkoxy group, a hydroxyl group, an ether group, an ester group, a cyano group, an amido group, an imido group, a silyl group and a chain hydrocarbon group substituted by a polar group (a halogen atom, an alkoxy group, a hydroxyl group, an ether group, an ester group, a cyano group, an amido group, an imino group or a silyl group), and in general formula (3), . . . represents a carbon-carbon saturated bond or a carbon-carbon unsaturated bond.

An optical pickup apparatus described in Item 16 is the optical pickup apparatus described in Item 15, wherein the resin containing polymers having an alicyclic structure includes block copolymers having poloymer block [A] containing a repeating unit [1] represented by a formula (11) and poloymer block [B] containing a repeating unit [1] and a repeating unit [2] represented by a formula (12) and/or a repeating unit [3] represented by a formula (13) and the block copolymers satisfy the relationship of a>b, where a is a mol fraction (mol %) of the repeating unit [1] in the polymer block [A] and b is a mol fraction (mol %) of the repeating unit [1] in the polymer block [B].

Formula (11)

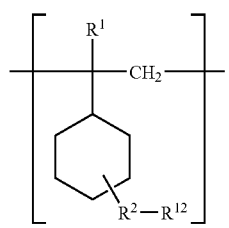

where in the formula, $R^1$ represents a hydrogen atom or an alkyl group having a carbon number of 1-20, $R^2$-$R^{12}$ each independently represent a hydrogen atom, an alkyl group having a carbon number of 1-20, a hydroxyl group, an alkoxy group having a carbon number of 1-20 or a halogen group, Formula (12)

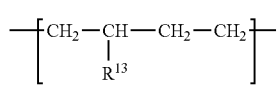

where in the formula, $R^{13}$ represents a hydrogen atom or an alkyl group having a carbon number of 1-20, Formula (13)

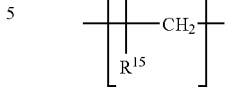

where in the formula, $R^{14}$ and $R^{15}$ each independently represent a hydrogen atom or an alkyl group having a carbon number of 1-20.

In the present specification, the "optical element" includes, for example, a lens, a prism, a diffraction grating optical element (diffraction lens, diffraction prism, diffraction plate, chromatic aberration correcting element), an optical filter (spatial low-pass filter, wavelength band-pass filter, wavelength low-pass filter, wavelength high-pass filter), a polarizing filter (analyzer, azimuth rotator, polarization separating prism), a phase filter (phase plate, hologram), to which, however, the invention is not limited.

Effect of the Invention

The invention makes it possible to provide an optical element wherein an antireflection film is formed on synthetic resin and deterioration of optical characteristics can be controlled even if the optical element is irradiated by a laser beam with a short wavelength, and to provide an optical pickup device employing the optical element.

Preferred Embodiment for Practicing the Invention

FIG. 1 is a schematic sectional view of an optical pickup device capable of conducting recording and reproducing of information for BD (Blu-ray Disc) or AOD (Advanced Optical Disc) as an information recording medium (which is also called an optical disc).

Optical pickup device PU is equipped with semiconductor laser LD that represents a light source as shown in FIG. 1. The semiconductor laser LD is a GaN type violet semiconductor laser that emits a light flux with a wavelength of about 400 nm or an SHG violet laser. A divergent light flux emitted from the semiconductor laser LD is transmitted through polarizing beam splitter BS, then, passes through ¼ wavelength plate WP to become a circularly polarized light flux, and is changed to a parallel light flux by collimator lens COL.

This parallel light flux is caused to enter expander lens EXP. The light flux which has passed through the expander lens EXP is enlarged in terms of its diameter, and it passes through diaphragm ST to become a light-convergence spot that is formed by objective lens OBJ on image recording surface DR through protective layer DP of optical disc OD. The objective lens OBJ is driven by biaxial actuator AC1 arranged around the objective lens in the focusing direction and in the tracking direction.

The objective lens OBJ is constructed solidly by fitting flange portion FL1 formed to be solid with an optical surface of lens group E1 and flange portion FL2 formed to be solid with an optical surface of lens group E2 together, and it is fitted in the optical pickup device PU accurately through the flange portion F11 of the first lens group E1. A reflected light flux modulated by information pits on information recording surface DR passes again through the objective lens OBJ, diaphragm ST and expander lens EX, to be converted into a converged light flux. This converged light flux is converted into a linear polarized light by ¼ wavelength plate WP, then, is reflected by the polarizing beam splitter BS, and passes through cylindrical lens CY and concave lens NL to be given astigmatism, to be converged on a light-receiving surface of photodetector PD. Thus, it is possible to conduct recording and reproducing of information for optical disc OD by using focus error signals generated based on output signals of photodetector PD and tracking error signals.

Incidentally, an information recording and reproducing apparatus can be constituted by the above optical pickup device PU and by an unillustrated optical information recording medium supporting means that supports optical disc OD so that recording and reproducing of information may be conducted by the optical pickup device. The optical information recording medium supporting means is composed of a rotary operating device that rotates optical disc OD by supporting the center portion of the optical disc OD.

The inventors of the invention made the following laser durability tests to investigate the specifications which do not deteriorate optical characteristics in the case, for example, of forming a film on the optical surface closer to the plane of emergence on objective lens OBJ used in the above optical pickup device shown in FIG. 1. More specifically, an antireflection film was formed on a synthetic resin base material, then, the film was irradiated by a laser beam (wavelength 405 nm, power density 23 mW/mm$^2$ on incident optical surface of objective lens OBJ) for 168 hours under the dry environment at ambient temperature 85° C., and the conditions on the surface of the irradiated portion were observed under the microscope. Incidentally, in the results of the tests on the following table, A represents that no change of a form was observed, B represents that changes in the form such as cavities and creases were slightly observed on the surface, and C represents that changes in the form such as cavities and creases were clearly observed on the surface.

Embodiment 1

Figure 2:
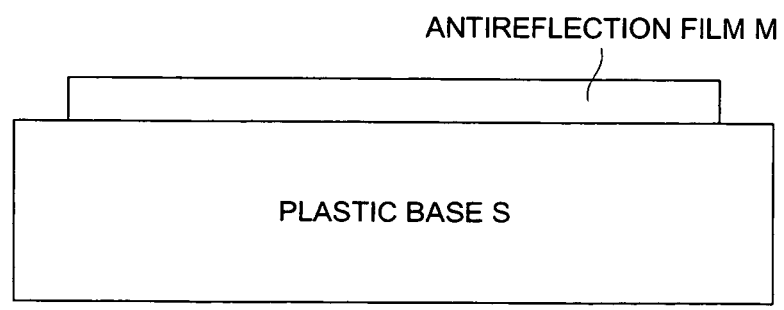
FIG. 2 is a diagram showing how antireflection film M composed of a single layer is formed on synthetic resin base material S.
Figure 3:
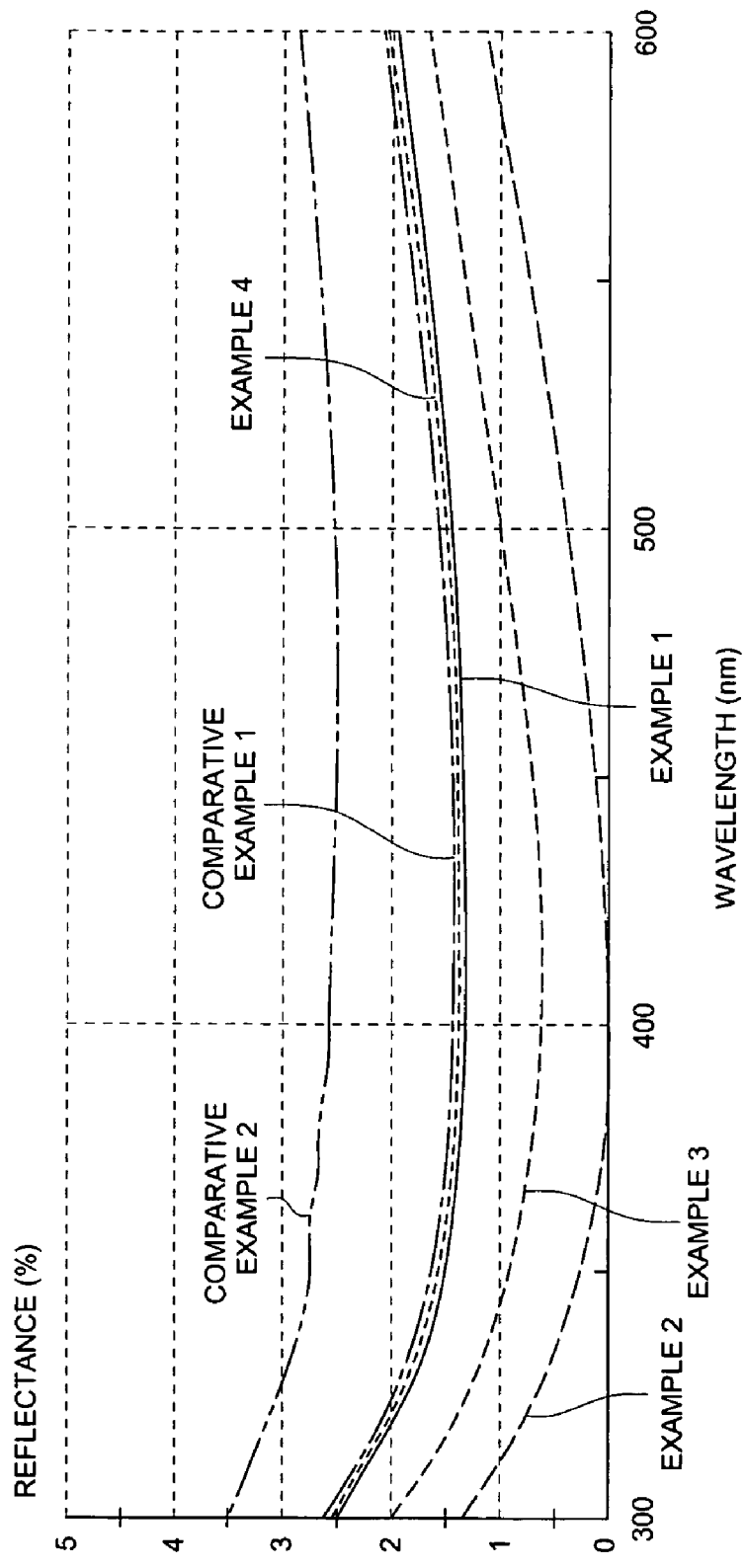
FIG. 3 is a graph showing reflectances for wavelengths for Examples 1-4 and Comparative Examples 1 and 2.

FIG. 2 is a diagram showing how antireflection film M composed of a single layer was formed on synthetic resin base material (plastic) S. Table 1 is one wherein materials constituting the antireflection film M, refractive indexes, film thicknesses, and results of the laser durability tests are included for Examples 1-4 and Comparative Examples 1 and 2. FIG. 3 is a graph showing reflectances for wavelengths for Examples 1-4 and Comparative Examples 1 and 2. In the present embodiment, polyolefin-based resin is used as a material of synthetic resin base material S, and the antireflection film M is composed only of a single layer film, therefore, there is no layer that is not in contact with the synthetic resin base material S.

In the present embodiment 1, the film forming method was conducted as follows.

The antireflection film was formed by a vacuum evaporation method. An optical element on which the antireflection film was to be formed was placed in a vacuum evaporation apparatus, and the apparatus was vacuumed until the degree of vacuum became 2E-3 Pa. When a film of $MgF_2$ was formed, vacuum evaporation was conducted while bringing $CF_4$ gas into the vacuum chamber until the degree of vacuum became 1E-2 Pa, because atom F tends to be dissociated easily. The vacuum evaporation was carried out by evaporating the vacuum evaporation material by means of an electron beam heating method while adjusting the intensity of electron beam so that the film forming speed was maintained to be approximately 2 Å/S until the thickness of the film became 73 nm, by observing the light reflectance in the optical monitor.

When fluoride was vacuum-evaporated, the film was formed while $CF_4$ gas was being brought into the chamber, and, $N_2$ gas was being brought into the chamber when nitride was vacuum-evaporated, and further, $O_2$ gas was being brought into the chamber when oxide was vacuum-evaporated.

Further, when a film of $MgF_2+SiO_2$ (15%) of Example 4 was formed, the vacuum evaporation was carried out by bringing only $CF_4$ gas into the chamber.

TABLE 1

| Film material | Refractive index | Film thickness (nm) | Laser durability |
|---|---|---|---|
| Example 1 | | | |
| $MgF_2$ | 1.39 | 73 | A |
| Example 2 | | | |
| $CaF_2$ | 1.23 | 82 | A |
| Example 3 | | | |
| $Na_3AlF_6$ | 1.35 | 75 | A |
| Example 4 | | | |
| $MgF_2 + SiO_2$ (10%) | 1.397 | 72.5 | A |
| Comparative Example 1 | | | |
| $MgF_2 + SiO_2$ (15%) | 1.400 | 72.3 | B |
| Comparative Example 2 | | | |
| $SiO_2$ | 1.460 | 69.3 | C |

As shown in Examples 1-3 of Table 1, it was found that laser durability was excellent for all cases if the antireflection film M is formed by each of materials containing no oxygen atoms ($MgF_2$, $CaF_2$, $Na_3AlF_6$). Further, as shown in Example 4, it was found that laser durability was also excellent even if the antireflection film M is formed by a mixture wherein a material ($MgF_2$) containing no oxygen atoms and a material ($SiO_2$) containing oxygen atoms are mixed and a rate of the material containing oxygen atoms is 10%.

However, as shown in Comparative Example 1, it was found that laser durability was deteriorated slightly if the antireflection film M is formed by a mixture wherein a material ($MgF_2$) containing no oxygen atoms and a material ($SiO_2$) containing oxygen atoms are mixed and a rate of the material containing oxygen atoms was increased to 15%. It was further found, as shown in Comparative Example 2, that laser durability was further deteriorated if the antireflection film M is formed by the material ($SiO_2$) containing oxygen atoms.

Embodiment 2

Figure 4:
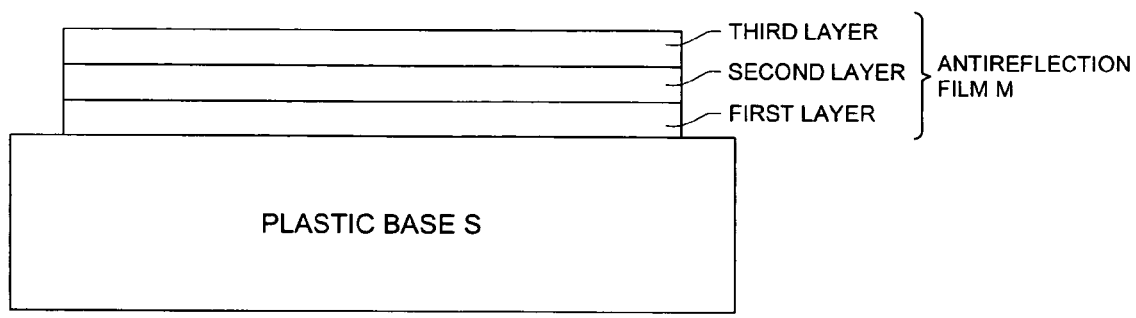
FIG. 4 is a diagram showing how antireflection film M composed of three layers is formed on synthetic resin base material S.
Figure 5:
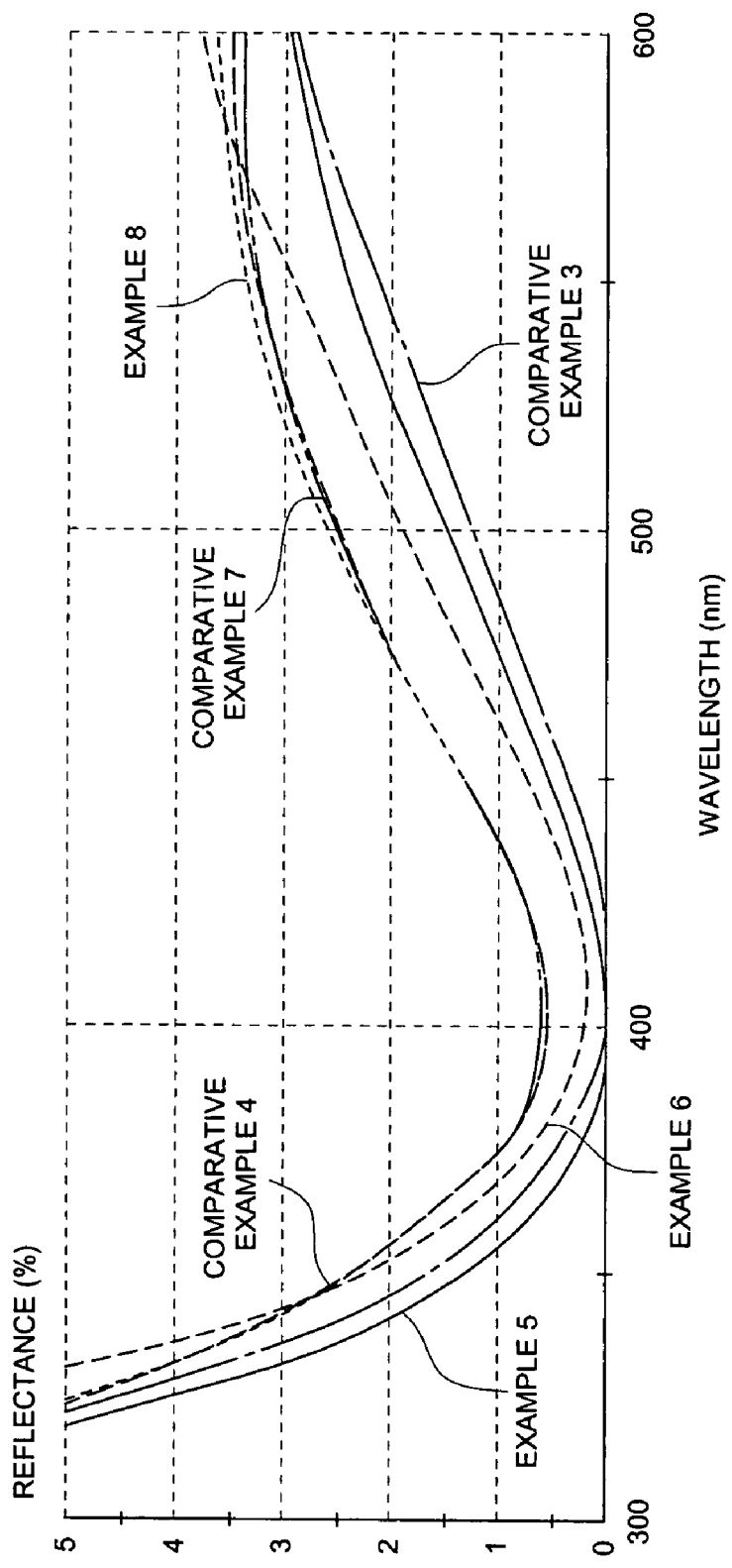
FIG. 5 is a graph showing reflectances for wavelengths for Examples 1-4 and Comparative Examples 1 and 2.

FIG. 4 is a diagram showing how antireflection film M composed of three layers was formed on synthetic resin base material S. Table 2 is one wherein materials constituting the antireflection film M, refractive indexes, film thicknesses, and results of the laser durability tests are included for Examples 5-8 and Comparative Examples 3 and 4. FIG. 5 is a graph showing reflectances for wavelengths for Examples 5-8 and Comparative Examples 3 and 4. In the present embodiment, polyolefin-based resin is used as a material of synthetic resin base material S, and the antireflection film M is composed of three layers, thus, a layer contacting the synthetic resin base material S is the first layer, and layer numbers are assumed to be increased as the layer is farther from the synthetic resin base material S.

TABLE 2

| Number of layers | Film material | Refractive index | Film thickness (nm) | Laser durability |
|---|---|---|---|---|
| Example 5 Laminated film including three layers made of materials containing no oxide ||||| 
| 3 | MgF$_2$ | 1.39 | 90 | A |
| 2 | SiN$_2$ | 1.9 | 26 | |
| 1 | MgF$_2$ | 1.39 | 20 | |
| Example 6 Laminated film wherein uppermost layer is made of oxide material ||||| 
| 3 | SiO$_2$ | 1.47 | 91 | A |
| 2 | SiN$_2$ | 1.9 | 26 | |
| 1 | MgF$_2$ | 1.39 | 20 | |
| Example 7 Laminated film wherein second layer is made of oxide ||||| 
| 3 | MgF$_2$ | 1.39 | 91 | A |
| 2 | SiO$_2$ | 1.47 | 60 | |
| 1 | MgF$_2$ | 1.39 | 50 | |
| Example 8 Laminated film wherein first layer is made of material containing 10% oxide ||||| 
| 3 | MgF$_2$ | 1.39 | 91 | A |
| 2 | SiO$_2$ | 1.47 | 60 | |
| 1 | MgF$_2$ + SiO$_2$ (10%) | 1.397 | 50 | |
| Comparative Example 3 Laminated film wherein first layer is made of oxide ||||| 
| 3 | MgF$_2$ | 1.39 | 90 | C |
| 2 | SiN$_2$ | 1.9 | 25 | |
| 1 | SiO$_2$ | 1.47 | 20 | |
| Comparative Example 4 Laminated film wherein first layer is made of material containing 15% oxide ||||| 
| 3 | MgF$_2$ | 1.39 | 90 | C |
| 2 | SiN$_2$ | 1.9 | 25 | |
| 1 | MgF$_2$ + SiO$_2$ (15%) | 1.4 | 20 | |

As shown in Examples 5-7 in Table 2, it was found that the laser durability is excellent for any case if antireflection film M is formed with material (MgF$_2$) containing no oxygen atoms as a material for the first layer, although materials (SiO$_2$) containing oxygen atoms are used for other layers. Further, as shown in Example 8, it was found that the laser durability was excellent even in the case where antireflection film M is formed with the mixture wherein a material (MgF$_2$) containing no oxygen atoms and a material (SiO$_2$) containing oxygen atoms are mixed and a rate of the material containing the oxygen atoms is 10% as a material for the first layer.

However, as shown in Comparative Example 3, it was found that the laser durability is worsened when antireflection film M is formed with a material (SiO$_2$) containing oxygen atoms as a material for the first layer, even when materials (MgF$_2$, SiN$_2$) containing no oxygen atoms are used for other layers. Further, as shown in Comparative Example 4, it was found that the laser durability is worsened even in the case where antireflection film M is formed with the mixture wherein a material (MgF$_2$) containing no oxygen atoms and a material (SiO$_2$) containing oxygen atoms are mixed and a rate of the material containing the oxygen atoms is increased to 15% as a material for the first layer.

The results of the aforementioned tests show that an optical element wherein oxidation-caused deterioration of the synthetic resin base material S is controlled even when the synthetic resin base material is irradiated by the light flux with wavelength 405 nm, and thereby the deterioration of optical characteristics is controlled, if at least the layer that is in contact with the synthetic resin base material S is made to be a film that is made of a material containing no oxygen atom, or a film that is made of a material representing a mixture wherein a material containing no oxygen atom and a material containing oxygen atoms are mixed and the rate of the material containing the oxygen atoms is less than 10%.

The invention has been explained above referring to the embodiments, to which, however, the invention is not limited, and it is naturally possible to modify and improve them. The invention is also effective in the occasion where the antireflection is composed of two layers or in the occasion where the antireflection is composed of four layers.

What is claimed is:

1. An optical pickup apparatus, comprising:
   a light source to emit a laser light flux having a wavelength of 350 nm to 450 nm; and
   an optical element arranged at a position where the laser light flux having a wavelength of 350 nm to 450 nm passes through the optical element;
   wherein the optical pickup apparatus conducts recording and/or reproducing information by converging the laser light flux having passed through the optical element onto a information recording plane of an optical information recording medium, wherein the optical element comprises:
   a synthetic resin base member; and
   an antireflection film provided on the synthetic resin base member and including a contact layer being in contact with the synthetic resin base member, wherein the contact layer is a film made of a material containing no oxygen atom or a film made of a mixed material of a material containing no oxygen atom and a material containing an oxygen atom in which the mixed material contains the material containing an oxygen less than 10%,
   wherein the synthetic resin base member is a base member made of a resin containing a polymer including an alicyclic hydrocarbon group.

2. The optical pickup apparatus of claim 1, wherein the material containing no oxygen atom is selected from magnesium fluoride, lanthanum fluoride, neodymium fluoride, cerium fluoride, calcium fluoride, cryolite (Na$_3$AlF$_6$), lead fluoride, lithium fluoride, thorium fluoride, silicon nitrate, and zinc sulfide.

3. The optical pickup apparatus of claim 1, wherein the antireflection film comprises plural players and all of the plural layers are a film made of a material containing no oxygen atom or a film made of a mixed material of a material containing no oxygen atom and a material containing an oxygen atom in which the mixed material contains the material containing an oxygen less than 10%.

4. The optical pickup apparatus of claim 1, wherein the antireflection film comprises plural layers and at least one layer of other layers except the contact layer is a film made of a material containing an oxygen atom.

5. The optical pickup apparatus of claim 1, wherein the antireflection film comprises plural layers and the uppermost layer is a film made of a material containing an oxygen atom.

6. The optical pickup apparatus of claim 1, wherein the resin containing polymers having an alicyclic hydrocarbon group contains repeating unit (a) having an alicyclic structure represented by following general formula (1) and repeating unit (b) comprising a chain structure represented by following general formula (2) and/or (3) so as to make the sum content of not less than 90 weight %, and, further, make the content of repeating unit (b) not less than 1 weight % and less than 10 weight % among whole repeating units of a polymer having a weight average molecular weight (Mw) of 1,000 to 1,000,000, and the chain of the repeating unit (a) satisfies the following formula: (That is $A \leqq 0.3 \times B$, where A=(a weight average molecular weight of a repeating unit chain having an alicyclic type structure), and B=(a weight average molecular weight of a polymer having an alicyclic type structure (Mw)× (the number of repeating units having an alicyclic type structure/the number of whole repeating units constructing the alicyclic type structure),

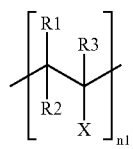

General formula (1)

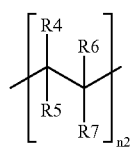

General formula (2)

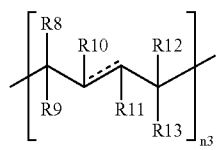

General formula (3)

where in formula (1), X represents an alicyclic hydrocarbon group, R1-R13 in formulas (1), (2) and (3) each independently represent a hydrogen atom, a chain hydrocarbon group, a halogen atom, an alkoxy group, a hydroxyl group, an ether group, an ester group, a cyano group, an amido group, an imido group, a silyl group and a chain hydrocarbon group substituted by a polar group (a halogen atom, an alkoxy group, a hydroxyl group, an ether group, an ester group, a cyano group, an amido group, an imino group or a silyl group), and in general formula (3), . . . represents a carbon-carbon unsaturated bond.

7. The optical pickup apparatus of claim 6, wherein the resin containing polymers having an alicyclic hydrocarbon group includes block copolymers having polymer block [A] containing a repeating unit [1] represented by a formula (11) and polymer block [B] containing a repeating unit [1] and a repeating unit [2] represented by a formula (12) and/or a repeating unit [3] represented by a formula (13) and the block copolymers satisfy the relationship of a>b, where a is a mol fraction (mol %) of the repeating unit [1] in the polymer block [A] and b is a mol fraction (mol %) of the repeating unit [1] in the polymer block [B],

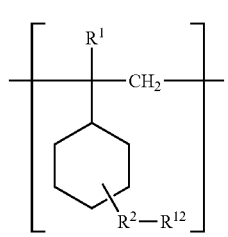

Formula (11)

where in the formula, $R^1$ represents a hydrogen atom or an alkyl group having a carbon number of 1-20, $R^2$-$R^{12}$ each independently represent a hydrogen atom, an alkyl group having a carbon number of 1-20, a hydroxyl group, an alkoxy group having a carbon number of 1-20 or a halogen group,

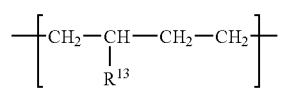

Formula (12)

where in the formula, $R^{13}$ represents a hydrogen atom or an alkyl group having a carbon number of 1-20,

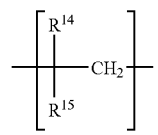

Formula (13)

where in the formula, $R^{14}$ and $R^{15}$ each independently represent a hydrogen atom or an alkyl group having a carbon number of 1-20.

* * * * *